US012639846B1

(12) United States Patent
Pronovost

(10) Patent No.: US 12,639,846 B1
(45) Date of Patent: May 26, 2026

(54) CROSS-ATTENTION PREDICTION MODEL USING DYNAMIC TOKEN RESOLUTION BASED ON SENSOR DATA AND/OR MAP DATA

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 265 days.

(21) Appl. No.: 18/227,813

(22) Filed: Jul. 28, 2023

(51) Int. Cl.
| | |
|---|---|
| *G06K 9/00* | (2022.01) |
| *G06T 7/11* | (2017.01) |
| *G06T 7/50* | (2017.01) |
| *G06T 7/73* | (2017.01) |
| *G06V 20/58* | (2022.01) |

(52) U.S. Cl.
CPC ................. *G06T 7/74* (2017.01); *G06T 7/11* (2017.01); *G06T 7/50* (2017.01); *G06V 20/582* (2022.01); *G06T 2207/20081* (2013.01); *G06T 2207/30261* (2013.01)

(58) Field of Classification Search
CPC ..... G06T 7/74; G06T 7/11; G06T 7/50; G06T 2207/20081; G06T 2207/30261; G06V 20/582
See application file for complete search history.

(56) References Cited

U.S. PATENT DOCUMENTS

| | | | |
|---|---|---|---|
| 9,514,391 B2 * | 12/2016 | Perronnin | ............. G06V 10/82 |
| 10,649,459 B2 | 5/2020 | Wang | |
| 11,048,265 B2 | 6/2021 | Silva | |
| 11,164,399 B2 * | 11/2021 | Agrawal | ................ G05D 1/024 |
| 11,500,385 B2 * | 11/2022 | Wang | ................ B60W 30/0953 |
| 11,731,639 B2 * | 8/2023 | Efrat Sela | ................ G06N 3/04 |
| | | | 701/27 |
| 2018/0348346 A1 * | 12/2018 | Vallespi-Gonzalez | ....................... |
| | | | G01S 7/4802 |
| 2020/0249685 A1 * | 8/2020 | Elluswamy | .......... G05D 1/0223 |
| 2021/0181758 A1 | 6/2021 | Das | |
| 2023/0041975 A1 * | 2/2023 | Caldwell | .......... B60W 60/0027 |
| 2023/0053785 A1 * | 2/2023 | Carvalho | ............. G06V 10/776 |

OTHER PUBLICATIONS

LatentFormer: Multi-Agent Transformer-Based Interaction Modeling and Trajectory Prediction, Elmira Amirloo et al., arXiv, Mar. 2022, pp. 1-10 (Year: 2022).*
Amirloo et al., "LatentFormer: Multi-Agent Transformer-Based Interaction Modeling and Trajectory Prediction," Noah's Ark Lab, Huawei, Tonoronto, Canada, Mar. 3, 2022, 10 pages.
Ronen et al., "Vision Transformers with Mixed-Resolution Tokenization," Tel Aviv University and Google Research, Apr. 27, 2023, 11 pages.
U.S. Appl. No. 18/104,082, filed Jan. 31, 2023.

* cited by examiner

*Primary Examiner* — Jayesh A Patel
(74) *Attorney, Agent, or Firm* — Lee & Hayes, P.C.

(57) ABSTRACT

A transformer-based machine-learned model may predict object behavior by using cross-attention between dynamically-sized patches of a top-down representation of the environment and an object location and/or previous behavior. A patch's size may be based at least in part on map data and/or sensor data and a portion of the top-down representation associated with an area of the environment that is outside a roadway may be excluded from patch generation.

20 Claims, 8 Drawing Sheets

CROSS-ATTENTION PREDICTION MODEL USING DYNAMIC TOKEN RESOLUTION BASED ON SENSOR DATA AND/OR MAP DATA

BACKGROUND

Autonomous vehicles may use sensors to capture data regarding an environment through which the autonomous vehicles traverse. Autonomous vehicles may use this sensor data to detect objects in the environment and/or to predict future positions of those objects to avoid collisions. However, sensors are not perfectly accurate and/or precise all the time and may even output large measurement errors, at times, which can put systems that rely on the sensors at risk. Moreover, predicting object behavior may be a particularly difficult task that may require a large amount of computational bandwidth, storage, and high latency, which may reduce the autonomous vehicle's reaction time to an event.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
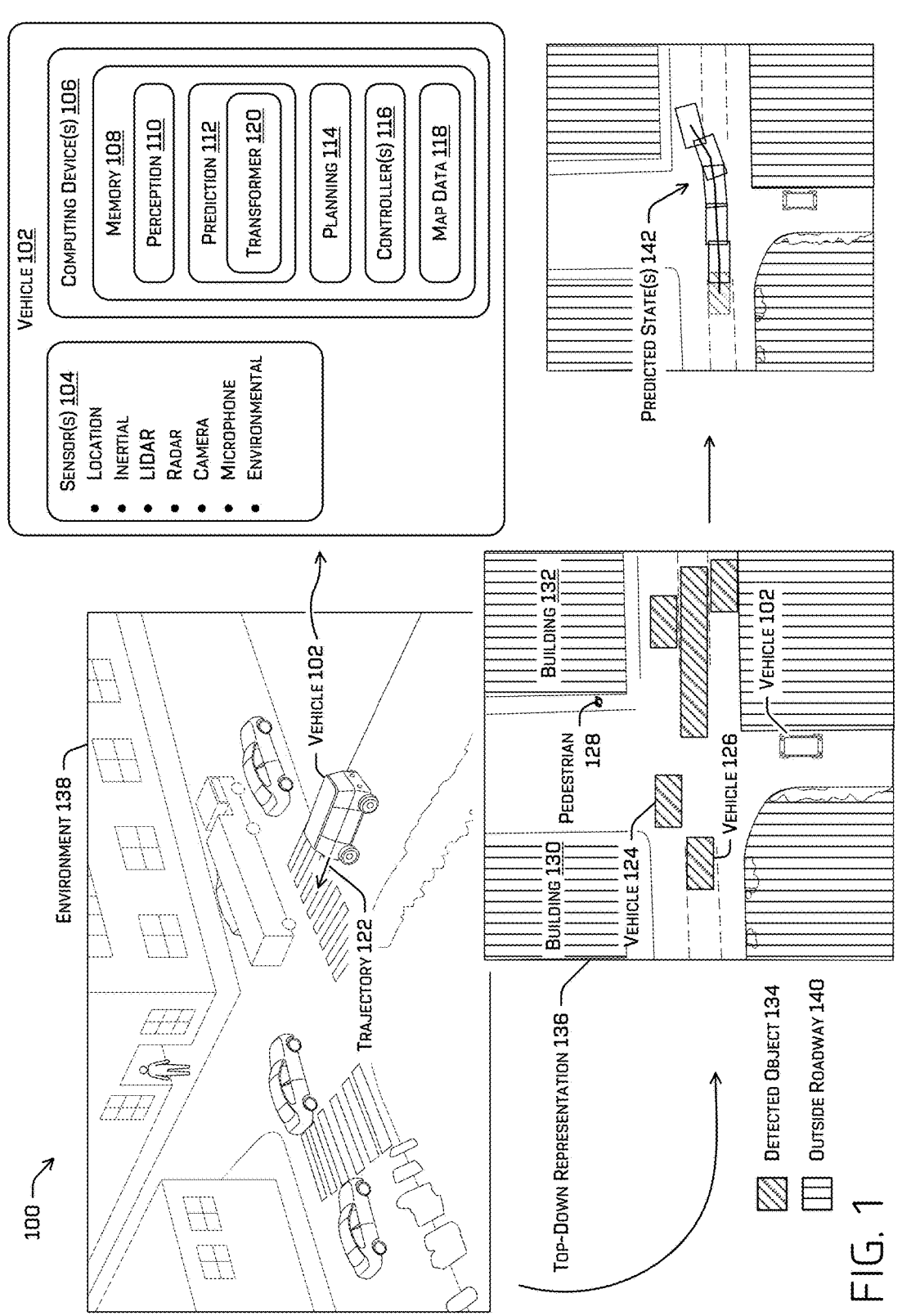
FIG. 1 illustrates an autonomous vehicle and an example scenario illustrating the object state prediction using a dynamic patch size for transformer-based machine-learned architecture cross-attention.

The techniques (e.g., hardware, software, machines, and/or processes) discussed herein may include a transformer-based machine learning model that uses differently sized patches of a top-down representation of an environment to determine a predicted state of an object at a future time. A vehicle may receive sensor data from one or more sensors and may determine a top-down representation of the environment, which may be a birds eye view image that encodes information associated with the environment such as a detected object in the environment and/or map data (e.g., which may indicate a roadway shape and extents, signage, static object(s), and/or the like), as discussed in U.S. Patent Application Pub. No. 2021/0181758, filed Jan. 30, 2020, the entirety of which is incorporated by reference herein for all purposes. The vehicle may generate patches over the top-down representation by generating differently sized patches (e.g., windows) associated with different portions of the top-down representation. For example, a single patch may indicate a specific area of the top-down representation and may be any shape (e.g., triangle, square, rectangle, polygon).

The transformer-based machine-learned model may determine a predicted state associated with an object by using cross-attention between a patch of the top-down representation at which an object has been detected and other patches of the top-down representation. In some examples, cross-attention may be computed between the patch associated with the object and up to all of the patches within a threshold distance of that object. In some examples, the predicted state may indicate a position, orientation, velocity, acceleration, and/or other state of the vehicle (e.g., door/aperture state, blinker state). In some examples, computational processing may increase as a function of the number of patches and the number of objects for which a prediction is to be made, which may include any dynamic object (i.e., an object capable of movement or self-movement) within a threshold distance of the vehicle.

To limit the computational processing and to decrease the latency for such cross-attention, the techniques may include generating features of the top-down representation at different resolutions depending on the data indicated by the top-down representation (which may be based on sensor data) and/or map data. This multi-resolution feature map may be generated by determining differently sized patches over the top-down representation. A patch size may be dynamically determined based on a variety of factors. For example, the size of a patch may be relatively smaller if the patch is close to the vehicle (e.g., within a threshold distance of the vehicle; near a route or path of the vehicle (e.g., within a threshold distance of the route or path); and/or is associated with a portion of the top-down representation that includes a detected object, a roadway feature (e.g., a curve of the road, junction, crosswalk, yield area, stop line), signage, a region of interest (e.g., construction, school zone, mass of detected objects such as pedestrians, animals, or detritus), and/or the like. Conversely, the size of a patch may be made relatively larger based at least in part on determining that a portion of the top-down representation associated with the patch is behind the vehicle, is far from the vehicle (e.g., a distance to the patch from the vehicle meets or exceeds a threshold distance), is occluded to one or more sensors of the vehicle, and/or the like.

Additionally or alternatively, a portion of the top-down representation may be excluded from patch generation if map data indicates that the portion of the top-down representation is outside a roadway and/or sidewalk or that the portion is occluded to one or more sensors of the vehicle. In some examples, a patch may be generated for a sidewalk portion although, in another example, sidewalk portions may be excluded from patch generation. For example, map data indicating buildings, parks, area off an overpass, and the like may be excluded from patch generation. Accordingly, no patch would be generated for such a portion, saving computational space and time. Moreover, the larger patches result in a lower resolution of the feature map for those portions associated with larger patches and smaller patches result in a higher resolution feature map for those portions associated with smaller patches.

In some examples, the vehicle may use sensor data and simultaneous localization and mapping (SLAM) techniques to determine a pose (i.e., position and orientation) of the vehicle relative to the environment, which the vehicle may use to identify where the vehicle is in the environment and what portion of map data is associated with the vehicle's current location and pose in the environment. The vehicle may then use this localization to determine a portion of map data that is associated with a patch to determine the size of patches that should be generated for the top-down representation.

The map data may include, for example, geometric data and embeddings associated with the geometric data. The geometric data may identify a location, dimensions, shape, and/or label associated with static features of the environment. In some examples, the location, dimensions, and/or shapes indicated by the geometric data may be three-dimensional. This map data may have previously been generated using a combination of sensor data collected from a vehicle and labelling of such data using machine-learned model(s) and/or human labelling. For example, a label may include a semantic label indicate that a portion of the geometric data is associated with a static object classification, such as a ground plane, roadway/drivable surface, building, signage, or various other static objects (e.g., mailbox, fountain, fence). Additionally or alternatively, the label (e.g., a semantic label and/or numeric or encoded label) may indicate a material type associated with a portion of the environment, such as asphalt, glass, metal, concrete, etc. These material types may have material characteristics associated with them, such as reflectivity, opacity, static coefficient, permeability, occlusion likelihood, and/or the like. The geometric data may be stored and/or indicated in any suitable manner, such as using a polygon representation, a digital wire mesh representation, and/or the like.

In some examples, patch generation may be conducted as a preprocessing operation and may occur one time for a time period or distance of travel. In other words, the patch generation may be conducted periodically and less frequently than predicting future state(s) of an object. The preprocessing may further comprise determine a feature map for the top-down representation where the feature map may have different resolutions at different locations in the map based on the patch sizes over the top-down representation. For example, the feature map may comprise an embedding determined by an encoder of the transformer-based machine-learned model for a respective patch. Up to each patch may have its own embedding determined by the transformer-based machine-learned model. In some examples, the transformer-based machine-learned model may flatten the patches (e.g., convert separate patches into a series of vectors representing each patch). The transformer-based machine-learned model may use these flattened patches for processing by encoders of the transformer-based machine-learned model to determine respective embeddings for the patches. For example, the transformer-based machine-learned model may include a first encoder to determine an embedding based at least in part on a flattened patch (e.g., a vector that represents the underlying top-down representation). The embedding determined for a patch may be based on and encode the data indicated by the portion of the top-down representation with which the patch is associated. For example, this data may include object data, map data, and/or other environment data.

In some examples, a second encoder of the transformer-based machine-learned model may determine an embedding associated with an object for use in determining a predicted state of the object. This embedding may be determined by a second encoder of the transformer-based machine-learned model and may be based at least in part on an embedding of a patch associated with the object, previous behavior associated with the object, current motion of the object, and/or a position of the object in the environment. In some examples, the previous behavior and/or position of the object may previous behavior of the object up until a current time and the position of the object may be a current position of the object. In such an instance, the predicted state of the object may be a next predicted state of the object. One or more predicted states of the object may be determined up to a time horizon.

For example, the transformer-based machine-learned model may determine a series of predicted states, each associated with a different time, such as 1, 2, 3, 4, and 5 seconds into the future; 0.5, 1, 1.5, 2, 2.5, and 3 seconds into the future; or the like. In an example where a predicted state is being determined for the object at a time subsequent to a first time in the future, the previous behavior and position may be defined by the last tick. For example, where the transformer-based machine-learned model determined predicted states for the object at 1, 2, 3, 4, and 5 seconds into the future, to determine the predicted state of the object at 2 seconds into the future, the previous behavior may comprise a hidden behavior state determined by the transformer-based machine-learned model for the predicted state of the object at 1 second into the future and the position may be a predicted position indicated by the predicted state of the object at 1 second into the future. This hidden state may be an output of a recursive neural network that is part of the transformer-based machine-learned model.

Regardless, either encoder (for determining the top-down encoding for a patch or the object embedding) may comprise one or more linear layers that project a flattened patch (and, in some examples, the positional embedding concatenated to the flattened patch) into an embedding space according to the description herein. In some examples, a linear layer may comprise a normalization layer, a multi-headed attention layer, an addition layer (that adds a an input to a previous component to an output of that component), and/or a multi-layer perceptron. In some examples, the linear layer may be arranged to include a first part comprising a multi-headed attention layer followed by a normalization and/or addition layer that normalizes the output of the multi-headed attention layer and adds the input provided to the multi-headed attention layer to the normalized output of the multi-headed layer. The linear layer may include one or more of these first parts followed by a multi-layer perceptron with a number of heads equal to a number of dimensions of the output vector of the last first part. The multi-layer perceptron may output the final embedding that is associated with the original input data (e.g., an image patch, a lidar patch, a map patch and embedding(s)). See U.S. patent application Ser. No. 18/104, 082, filed Jan. 31, 2023, the entirety of which is incorporated in its entirety herein for all purposes, for additional details.

Once a first embedding has been determined by a first encoder for a top-down representation patch and a second embedding has been determined by a second encoder for a detected object, the first embedding and the second embedding may be used to determine a predicted state of the object. This predicted state output that may be used by the vehicle to determine control(s) for one or more operations of the vehicle.

In some examples, determining the predicted state from the first and second embeddings may comprise determining an attention score based at least in part on the first embedding and the second embedding. In such an example, the object embedding may be used as a query, the top-down embedding may be used as a key, and the top-down embedding may be used as a value. Note an attention score may be determined for up to all of the top-down embeddings within a threshold distance of the object or the vehicle and that the key and value may be the same. Determining the attention score may include determining a dot product of the first embedding and the second embedding. This attention score may be used to determine a predicted state of the sensor data by multiplying the attention score with the key, i.e., a top-down patch. This may be repeated for object embedding and up to each top-down patch. In an additional or alternate example, a threshold may be used to determine that a location in the environment is associated with a greatest attention score and should therefore indicate the predicted position of the object. In some examples, threshold(s) may be further applied to other characteristics, such as orientation, velocity, acceleration, and/or other state if the attention score meets or exceeds a threshold attention score or is determined the greatest attention score or combination of attention scores across the different predicted state properties. In yet another example, the object embedding and a top-down embedding and/or the attention score may be provided as input to a machine-learned model, such as a multi-layer perceptron or transformer decoder, that determines the predicted state, such as via a binary output or likelihood (e.g., posterior probability) that may be softmaxed.

The techniques discussed herein may increase the accuracy of predicted movements and/or states of an object by using cross-attention to increase the amount of scene context processed to determine the predicted state. Moreover, the techniques reduce latency and computational processing and/or storage for cross-attention to minimize the impact of cross-attention on overall prediction latency and computing requirements on the vehicle and/or on a computing device running a simulation of the vehicle operations and/or environment. Accordingly, the techniques may improve the safety and efficacy of autonomous vehicle operations while reducing stutters or hesitations that may be introduced by latency.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a prediction component 112, a planning component 114, system controller(s) 116, map data 118, and/or transformer 120 (i.e., a transformer-based machine learning model). For example, the memory 108 may store processor-executable instructions that, when executed by one or more processors, execute various operations. In some examples, the perception component 110 may include a simultaneous localization and mapping (SLAM) component or, in additional or alternative examples, the SLAM component may be separate and may independently be trained using the seminal model discussed herein.

In general, the perception component 110 may determine what is in the environment surrounding the vehicle 102 and the planning component 114 may determine how to operate the vehicle 102 according to information received from the perception component 110. For example, the planning component 114 may determine trajectory 122 for controlling the vehicle 102 based at least in part on the perception data and/or other information such as, for example, localization information (e.g., where the vehicle 102 is in the environment relative to a map and/or features detected by the perception component 110), output determined by the transformer 120 such as predicted state(s) of an object, and/or the like. In some examples, the perception component 110 may comprise a pipeline of hardware and/or software, which may include one or more GPU(s), ML model(s), Kalman filter(s), and/or the like.

The trajectory 122 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory 122 may comprise a target heading, target steering angle, target steering rate, target position, target velocity, and/or target acceleration for the controller(s) 116 to track. In some examples, the trajectory 122 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification (e.g., semantic label, object state), sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, orientation, velocity, acceleration, classification, and/or other state (e.g., door state, turning state, intent state such as signaling turn) of that object. The predicted portion of a track may be determined by the prediction component 112 and/or transformer 120, in some examples. In some examples, the current and/or historical portion of the track may be used as the previous behavior of an object that may be used as part of an object embedding, as discussed further herein.

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment. For example, the perception component may detect dynamic objects, such as a cyclist, vehicle, pedestrian, or the like, and/or static objects, such as poles, traffic signage, general signage, a drivable surface, sidewalk, public furniture, building, etc. Referring to FIG. 1, the perception component 110 may detect vehicle 124, vehicle 126, pedestrian 128, and other objects, such as objects indicated by diagonally-hashed rectangles 134 in the top-down representation 136. In some examples, the perception component 110 may additionally or alternatively detect building 130 and building 132. In some examples, these buildings may additionally or alternatively be indicated in map data 118 stored in the memory 108. The map data 118 may indicate other stationary (static) objects and/or zones, such as crosswalks, sidewalks, signage, construction zones (e.g., which may be temporarily indicated in the map data), and/or the like.

In some examples, the perception component 110 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

The perception component 110 may additionally or alternatively determine a top-down representation 136 of the environment based at least in part on the sensor data, as discussed in U.S. Patent Application Pub. No. 2021/0181758, filed Jan. 30, 2020, and/or U.S. Pat. No. 10,649, 459, Apr. 26, 2018, the entirety of which are incorporated by reference herein for all purposes. For example, the top-down representation may be generated based at least in part on an object detection generated by the perception component 110 and/or map data 118. FIG. 1 depicts an example top-down representation 136 that may be generated by the perception component 110 based at least in part on sensor data and/or map data 118 for the environment 138. This top-down representation 136 may include indications of detected objects as diagonally-hashed rectangles 134 and portions of the environment outside the roadway may be indicated by vertical hashes 140. In some examples, the top-down representation may include a data structure, such as an image, where each pixel is associated with one or more channels indicating different characteristics of the environment.

For example, instead of indicating color data, a pixel of the top-down representation may indicate object data and/or map data, each of which may include one or more channels of the image. In an RGB image, a first channel indicates an amount of red at a pixel, a second channel indicates an amount of blue at the pixel, and a third channel indicates an amount green at the pixel, which collectively make up a color for that pixel. In this instance, a pixel may have channel(s) dedicated to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), and/or the like. To further illustrate how this may practically be carried out as an example and without limitation, an object instance channel of the pixel may indicate a binary indication, such as 1 or 0, that an object exists at the pixel/location or a likelihood that an object exists at the pixel/location that was output by the perception component 110 as a number between 0 and 1 may be converted to a value that may depend on a number of bits or dynamic range associated with the pixel.

For example, if a channel of a pixel of the top-down representation 136 has 32-bits, the likelihood may be converted to a 32-bit representation of the number between 0 and 1-a likelihood of 0.25 could be represented as the value 8 or a likelihood of 0.3 could be represented as the value 10 in the object instance channel for that pixel. Pixel channels may have more or less bits and may encode object data differently. For example, a semantic object classification may be encoded using a value where 0 represents no object being present, 1 represents a pedestrian, 2 represents a vehicle, 3 represents an oversized vehicle, 4 represents a construction zone, and/or the like. To give another candidate example, object orientation may be quantized such that orientations between 0 and 10° may be quantized as the value 0, orientations between 10° and 20° may be quantized as the value 1, and so on, depending on the number of bits available for an orientation channel associated with the pixel. In an additional or alternate example, one of the object channels may indicate whether other object channels are associated with current, previous, or predicted object data.

In some examples, multiple versions of the top-down representation environment may be determined in association with different times. For example, a first top-down representation may be associated with a current environment state, one or more second top-down representations may be associated with previous environment state(s), and/or one or more third top-down representations may be associated with predicted environment state(s).

The top-down representation 136 may additionally or alternatively include channel(s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, cross-walk, parking location, passenger pickup/drop-off location), and/or the like. The channel(s) of the top-down representation 136 may additionally or alternatively indicate that a location associated with a pixel is outside a roadway and/or a sidewalk to facilitate exclusion of some areas of the top-down representation from the patch generation process discussed herein.

The data produced by the perception component 110 may be collectively referred to as perception data, which may include the top-down representation 136 and/or a track associated with an object. Once the perception component 110 has generated perception data, the perception component 110 may provide the perception data to prediction component 112 and/or the planning component 114. The perception data may additionally or alternatively be stored in association with the sensor data as log data. This log data may be transmitted to a remote computing device (unillustrated in FIG. 1 for clarity) for use as at least part of training data for transformer 120.

In some examples, the prediction component 112 may receive sensor data and/or perception data and may determine a predicted state of dynamic objects in the environment. In some examples, dynamic objects may include objects that move or change states in some way, like traffic lights, moving bridges, train gates, and the like. The prediction component 112 may use such data to a predict a future state, such as a signage state, position, orientation, velocity, acceleration, other object state, or the like, which collectively may be described as prediction data. For example, the transformer 120 discussed herein may determine predicted states 142 for the detection of vehicle 126. Predicted states 142 include a series of predicted states, each of which may be associated with different times in the future up to a horizon time. A predicted state may include, for example, a predicted object position, orientation, area occupied, velocity, acceleration, and/or other state and a path between centers of the ROI, depicted as a line, may be determined as a predicted path of the object. In the depicted example, the predicted state(s) 142 may include predicted states for five ticks into the future, where each tick is associated with a unit of time. For example, each tick may be associated with a 0.1, 0.5, 1, 2, or other unit of seconds interval of time into the future. Where each tick is associated with one second, the predicted state(s) 142 may indicate a predicted state of the vehicle 126 at 1, 2, 3, 4, and 5 seconds into the future, where 5 seconds in the future is the horizon time of prediction.

The planning component 114 may use the perception data received from perception component 110 and/or prediction data received from the prediction component 112 and/or transformer 120, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 114 may determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 micro-second, half a second) to control the vehicle to traverse the route (e.g., in order to avoid any of the detected objects); and select one of the candidate trajectories as a trajectory 122 of the vehicle 102 that may be used to generate a drive control signal that may be transmitted to drive components of the vehicle 102. In some examples, the trajectory 122 may be part of a series of trajectories (i.e., a path) determined by a tree search conducted by the planning component 114 based at least in part on the sensor data, perception data, prediction data, map data 118, and/or top-down representation 136, as discussed in more detail in U.S. Patent Application Pub. No. 2023/0041975, filed Aug. 4, 2021, the entirety of which is incorporated by reference herein for all purposes. FIG. 1 depicts an example of such a trajectory 122, represented as an arrow indicating a heading, velocity, and/or acceleration, although the trajectory itself may comprise instructions for controller(s) 116, which may, in turn, actuate a drive system of the vehicle 102.

In some examples, the controller(s) 116 may comprise software and/or hardware for actuating drive components of the vehicle 102 sufficient to track the trajectory 122. For example, the controller(s) 116 may comprise one or more proportional-integral-derivative (PID) controllers to control vehicle 102 to track trajectory 122.

Example System

Figure 2:
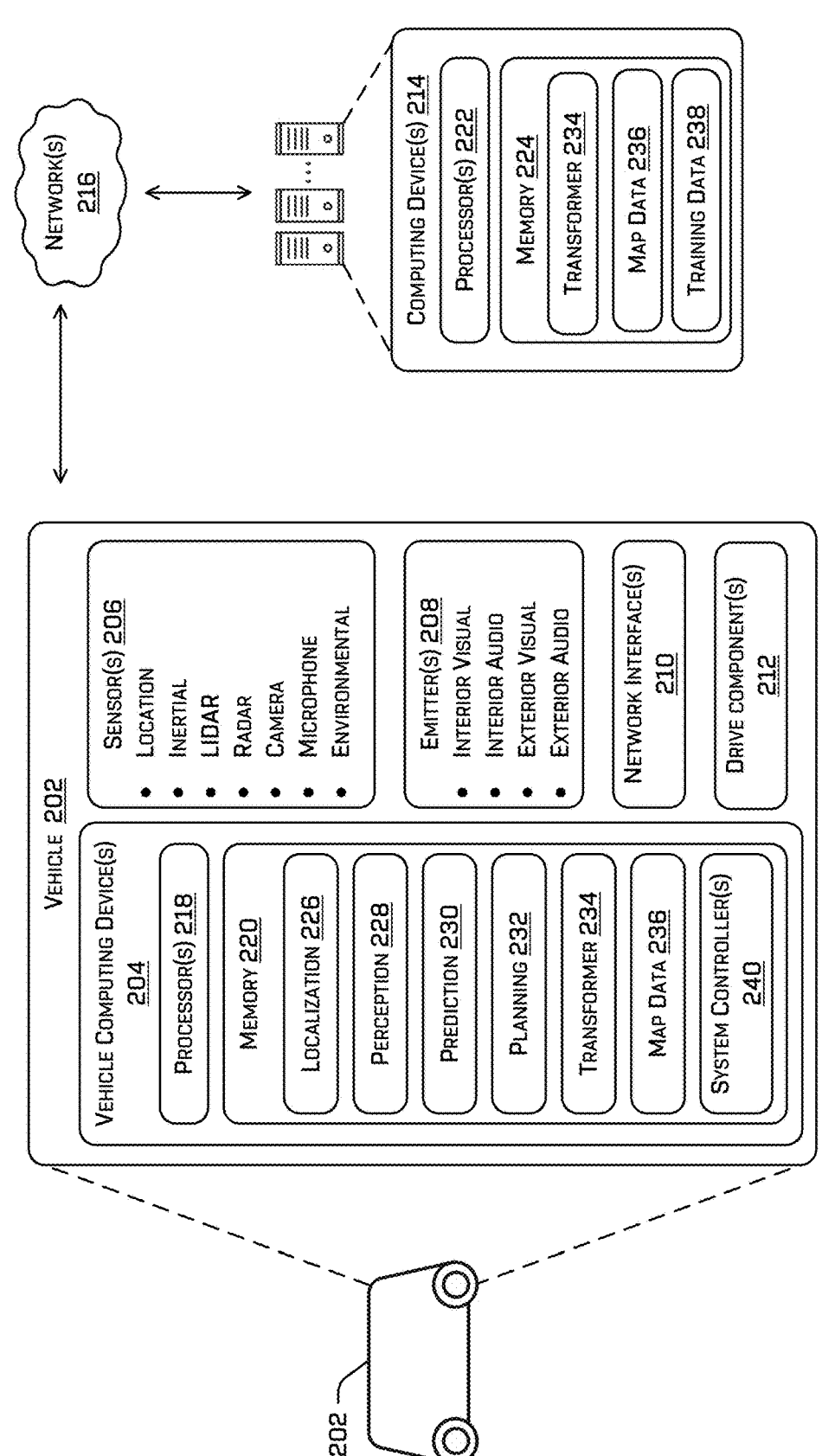
FIG. 2 illustrates a block diagram of an example system integrating and/or training a transformer-based machine-learned model that utilizes cross-attention between sensor data and map data.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 2G, 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, transformer 234, map data 236, training data 238, and/or system controller(s) 240—zero or more portions of any of which may be hardware, such as GPU(s), CPU(s), and/or other processing units. Perception component 228 may represent perception component 110, prediction component 230 may represent prediction component 112, planning component 232 may represent planning component 114, transformer 234 may represent transformer 120, map data 236 may represent map data 118, and/or system controller(s) 240 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data 236, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component 230, and/or transformer 234 a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity (ies), acceleration(s), and/or other states of the objects and/or map data in the environment. For example, the top-down representation may be an image with additional data embedded therein, such as where various pixel channel values encode the perception data and/or map data discussed herein. Data determined by the perception component 228 is referred to as perception data.

The prediction component 230 may predict a future state of an object in the environment surrounding the vehicle 202. In some examples, the prediction component 230 may include the transformer 234, although in additional or alternate examples the transformer 234 may be separate component. The future (predicted) state may indicate a predicted object position, orientation, velocity, acceleration, and/or other state (e.g., door state, turning state, intent state such as signaling turn) of a detected object. Data determined by the prediction component 230 is referred to as prediction data. In some examples, the prediction component 230 may determine a top-down representation of a predicted future state of the environment. For example, the top-down representation may be an image with additional data embedded therein, such as where various channel pixel values encode the prediction data discussed herein.

The planning component 232 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 232 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, the map data 236 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

The memory 220 and/or 224 may additionally or alternatively store a mapping system, a planning system, a ride management system, simulation/prediction component, etc.

As described herein, the localization component 226, the perception component 228, the prediction component 230, the planning component 232, transformer 234, and/or other components of the system 200 may comprise one or more ML models. For example, localization component 226, the perception component 228, the prediction component 230, and/or the planning component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

The transformer 234 may comprise a transformer comprising encoder(s) and/or decoder(s) trained to generate the perception data discussed herein. For example, the encoder(s) and/or decoder(s) may have an architecture similar to visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, ROBERTa, XLNet, GPT, GPT-2, GPT-3, GPT-4, or the like. Additionally or alternatively, the transformer 234 may comprise one or more neural network components, such as a convolutional neural network (CNN), multi-layer perceptron (MLP), VQGAN, which combines an autoregressive transformer with convolutional network components (or any other generative adversarial network (GAN), CLIP (which can be used to enhance sensor data learning with natural language supervision, or VQGAN and CLIP used together. The transformer 234 may comprise the transformer-based machine-learned model architecture and processes discussed in more detail herein.

In some examples, the transformer 234 may be trained at computing device(s) 214 based at least in part on map data 236 (which may be the same or different than the map data 236 stored in memory 220 on the vehicle 202) and/or training data 238. Training data 238 may include task-specific training data, such as sensor data and associated ground truth perception data taken from log data or synthetically generated; sensor data and/or perception data and associated ground truth prediction data taken from log data or synthetically generated; sensor data and associated ground truth localization data taken from log data or synthetically generated; and/or sensor data, perception data, prediction data, and/or localization data and associated ground truth prediction data taken from log data or synthetically generated. For example, the training data may comprise input data, such as sensor data, a top-down representation, and/or an object track, and ground truth data associated with the task for which the transformer 234 is being trained, such as the predicted state of an object. In some examples, training the transformer 234 may be self-supervised or semi-self supervised using the ground truth data discussed above. For example, the ground truth data may include perception data determined by the perception component 228 of the vehicle for a first stage of training the transformer 234. Further refined ground truth data determined by a larger, more complex ML model and/or human labelling may be used for a second stage of training the transformer 234 that may further refine the training of the transformer 234, although in one example, just this complex ML model and/or human labelling may be used instead of using two stages. In an additional or alternate example, a larger and more complex model than could be used on vehicle 202 can be used to generate the ground truth data and/or human labelling may additionally or alternatively be used to generate the ground truth data, such as by modifying ground truth data generated from log data or a powerful offline model to adjust the ground truth data for errors. In some examples, once the transformer 234 has been trained at computing device(s) 214, it may be transmitted to vehicle 202 for storage in memory 220 and may cause processor(s) 218 to cause the operations discussed herein.

In some examples, training the transformer 234 may include encoder and decoder portions configured according to the discussion herein. Training the transformer-based machine-learned model may comprise receiving training data that includes input data, such as a top-down representation and object data, and ground truth data associated with the outputs for which the transformer-based machine-learned model is being trained, such as a ground truth future object data. For example, the top-down representation and object data may be associated with a first time and the ground truth data may include perception data determined by the vehicle 202 at a later time. This ground truth data may include a top-down representation generated at the later time and an object detection associated with the same object also generated at that later time that can be compared to a predicted top-down representation and/or predicted state of the object that was generated by the transformer 234 using the input data. The input data and/or ground truth data may include perception data that was determined based on the sensor data that was generated by the vehicle and previously stored as part of log data.

For example, the perception data may include a series of current top-down representations and current object detections and/or tracks. In other words, a top-down representation, object detection, and/or track for the detected object may be determined at each computational tick, each of which may indicate current data relative to that computational tick. Since this data may be stored as log data, one tick of this data may be used as input data and subsequent data that comes later in time may be used as ground truth a prediction generated from the input data. For example, the vehicle may determine a first top-down representation of an environment, a first object detection for an object at the first time, and a first track for the object up to that first time and a second top-down representation of the environment and a second object detection for the object at the second time. Training the transformer 234 may comprise using the data from the first time as input to determine a predicted top-down representation and/or predicted state of the object at the second time and determining an error between the predicted top-down representation and/or predicted state and the second top-down representation and/or second object detection.

Training the transformer-based machine-learned model discussed herein may include determining a difference between an output of the transformer-based machine-learned model and the ground truth data. A loss (e.g., L1 loss, L2 loss, Huber loss, square root of the mean squared error, Cauchy loss, or another loss function), may be determined based on this difference and that loss may be backpropagated through the component(s) of the transformer-based machine learning model architecture discussed herein. This means that parameter(s) of any of these components may be altered (using gradient descent) to reduce this loss such that, if the transformer-based machine-learned model repeated the process on the same input data, the resultant loss would be less than it was on the last run. This process may be repeated for multiple iterations of data, known as a training dataset. For example, the training may comprise altering one or more weights of the weight(s) that generate the queries, keys, and values discussed herein, parameter(s) of the multi-headed attention layers (of any of the encoder(s) and/or decoder(s)), weight(s) and/or biases associated with the feedforward network(s) discussed herein (of any of the encoder(s) and/or decoder(s)), and/or the embedding(s) themselves associated with the top-down patches. However, in some examples, the embedding(s) associated with the top-down patches may be determined by a separately learned process that may be trained independently.

In some examples, training the transformer-based machine learning model architecture portion for determining an embedding for a top-down patch or an object patch may include instantiating the embedding(s) as tensors with random values. An encoder may receive a portion of a top-down representation or object data and may determine an embedding associated therewith, modifying the original random embedding associated with the portion of a top-down representation or object data if this is the first time this embedding has been updated by the encoder as part of training.

The training may be conducted such that decoder may determine a reconstruction of a top-down representation or object data, based at least in part on the embedding generated by the encoder. In other words, the decoder is trained to determine a reconstruction that matches the originally input a top-down representation or object data. Ideally, the reconstruction and the top-down representation or object data would be identical. Training the example architecture may comprise determining a loss (e.g., L1 loss, L2 loss, Huber loss, square root of the mean squared error, Cauchy loss, or another loss function) based on a difference between the reconstruction output by the encoder and the top-down representation or object data used by the encoder to generate the embedding. Gradient descent may then be used by altering parameter(s) of the encoder and/or decoder to reduce the loss.

In some examples, training the example architecture may further comprise masking and/or removing a portion of the top-down representation or object data provided as input to the encoder. In some examples, the masking may be gradually introduced, i.e., the masking/removal may start at some point after the beginning of the training and, in some examples, may progressively increase. In some examples, masking may start from the beginning of training. Masking may comprise voiding, covering, or otherwise replacing portions of the top-down representation or object data with nonce values or noise. Again, this removal may gradually increase as training epochs pass and/or as the training accuracy hits certain milestones, such as meeting or exceeding accuracy metric(s), such as by reducing the average loss below an average loss threshold.

In some examples, the process described above may be used as a pre-training step, after which the decoder may be removed and the embedding(s) and/or the encoder may be trained using a loss determined for the transformer-based machine-learned model discussed above, comprising architecture(s) 400, 402, and/or 500. In such an example, a top-down embedding may be updated directly to reduce the loss and/or one or more parameters of any one or more of encoder 408, encoder 410, and/or decoder 528 may be modified to reduce the loss determined based at least in part on an output of architecture 500.

In some examples, the transformer-based machine learning model discussed herein, which may include architecture(s) 400, 402, and/or 500, may be reduced in size, which may reduce the computational resources required to store and/or run the architectures. For example, knowledge distillation may be used to reduce the architecture(s) 400, 402, and/or 500 to a smaller transformer-based machine learning model. Knowledge distillation may include, for example, transformer pruning, quantization, and/or student-teacher training, which may include response-based distillation, feature-based distillation, and/or relation-based distillation, and may be conducted offline, online, or via self-distillation.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 232 may generate instructions based at least in part on perception data generated by the perception component 228 and/or simulated perception data and transmit the instructions to the system controller(s), which may control operation of the vehicle 202 based at least in part on the instructions.

Memory 224 and/or memory 220 may additionally or alternatively store a simulation component. The simulation component may determine the prediction discussed herein using the transformer 234 and techniques discussed herein. In some examples, the simulation component may determine a simulation of the environment and/or the vehicle 202, such as simulating execution of a candidate action by the vehicle 202 and a predicted state of the environment based at least in part on the passage of time, progress of the vehicle, and response to execution of the candidate action by the vehicle 202 by any dynamic object(s) in the environment. For example, the simulation may comprise a representation of a position, orientation, movement, and/or quality of portions of the environment and/or the vehicle 202. The environment may comprise an agent, such as another vehicle, a pedestrian, vegetation, a building, signage, and/or the like. In some examples, the simulation component may receive a candidate action, map data 236, and/or environment state (which may be a current simulated environment state determined by the perception component 228 based at least in part on simulation data and/or a predicted environment state determined by the transformer 234). The simulation component may use this data as part of determining, by the transformer 234, a predicted state of object(s) and/or the environment responsive to the candidate action, i.e., should the candidate action be carried out by the vehicle 202.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Top-Down Patch Generation Process

Figure 3:
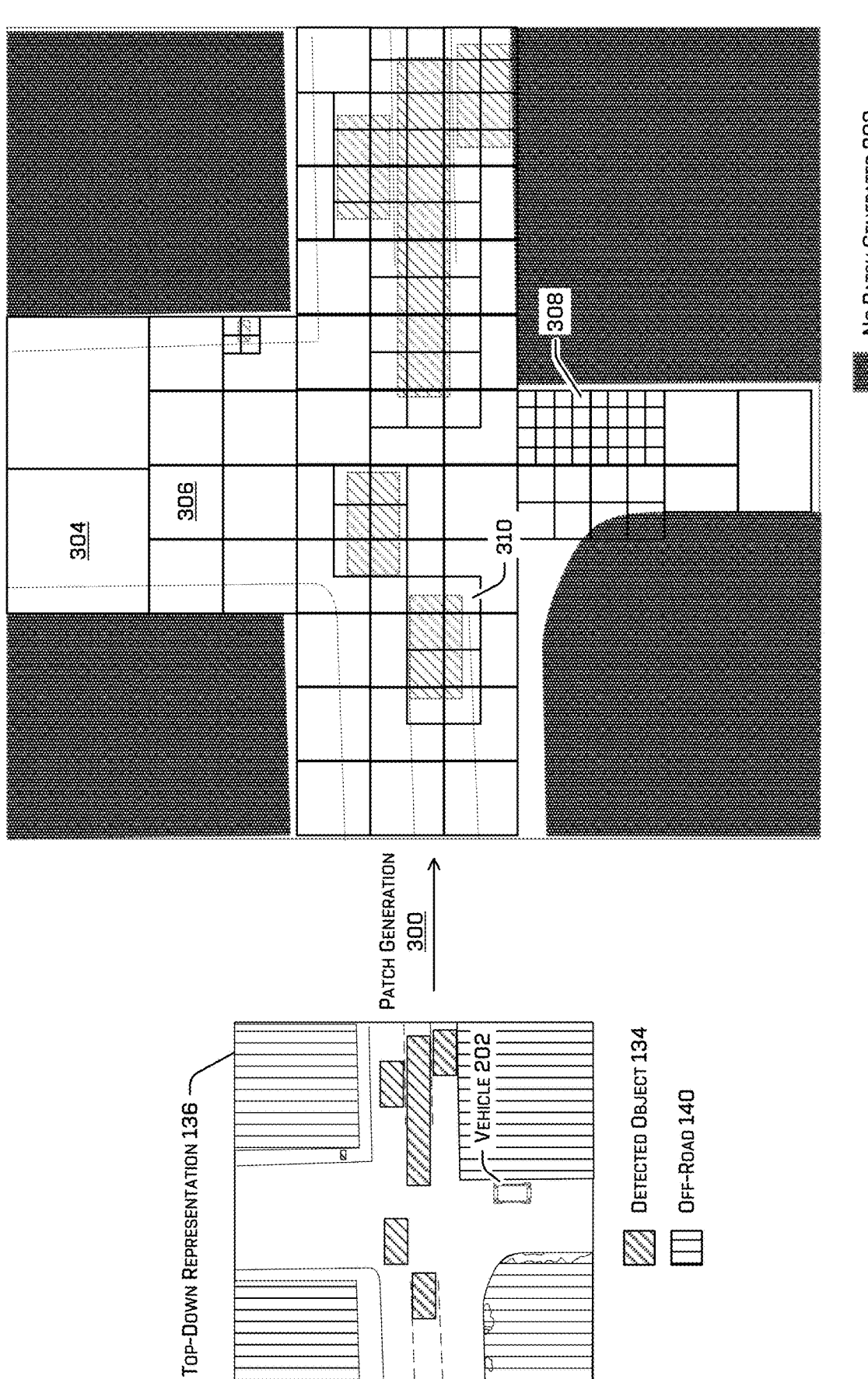
FIG. 3 illustrates an example of patch generation for a top-down representation into top-down patches.

FIG. 3 illustrates an example of patch generation 300 for a top-down representation 136 into top-down patches. The top-down representation 136 includes indications of multiple objects within the top-down representation 136, although it is understood that the top-down representation 136 may alternately include just the map data and the dynamic object(s) could be encoded separately. In the former example, one or more patches (and accordingly embeddings) may be generated for an object, whereas in the latter example, a single embedding may be generated per object.

In some examples, patch generation 300 may be conducted as a preprocessing operation that may be used as the basis for multiple object state predictions. For example, patch generation 300 may be conducted for an area of an environment around the vehicle 202 and may iteratively be updated based on motion of the vehicle 202 to add new patches to cover area an area of a new top-down representation that doesn't have any patches associated therewith, delete or move from cache to storage patches that are no longer in the area, and/or to resize patches based at least in part on newly occluded or revealed areas, object movement, and/or the like. In some examples, the top-down patches generated for a top-down representation 136 may be determined once for all the objects for which a predicted state is to be determined. The patch generation 300 may be conducted each tick (i.e., once for all predictions to be determined at that tick), once every n ticks (where n is a positive integer), or based at least in part on determining that a new top-down representation has been determined, determining that the vehicle 202 has moved p meters (where p is a positive integer), determining that one or more objects have moved q meters (where q is a positive integer, e.g., by determining a difference in position indicated by a track or a difference between top-down representations), and/or the like.

Patch generation 300 may comprise determining patches over the top-down representation 136, where a particular patch is associated with a portion of the top-down representation 136. The patch generation 300 may exclude from patch generation any portions of the top-down representation 136 indicated as being outside a roadway. In some examples, sidewalks may also be excluded, but in other examples, sidewalks may be included in the patch generation. For example, portions for which no patches are generated for the top-down representation 136 are shaded 302. Although the patches illustrated in FIG. 3 are squares or rectangles, the patches may be any other shape, such as triangles or other polygons.

The patch generation 300 may include dynamically sizing the patches based at least in part on the data in the top-down representation, which may include object data (which is determined based at least in part on sensor data and/or perception data) and/or map data. In some examples, the patch generation 300 may additionally or alternatively dynamically size a patch based at least in part on vehicle data, which may indicate data related to the vehicle 202, such as a position, classification (e.g., parked, crossing roadway/junction, turning, blinker state, aperture state, yielding/not-yielding to the vehicle 202), orientation, velocity, acceleration, state, current trajectory, next trajectory, path, and/or route associated with the vehicle, for example. Dynamically sizing a patch may include determining a size for a patch based at least in part on any of this data. In some examples, patch generation 300 for a portion of the environment may start with a default sized patch and may either scale the patch size up or down, either by resizing the patch or subdividing the patch. In some examples, the minimum size of a patch may be limited by a maximum number of patches for a scene and/or a minimum patch size.

For example, patches outside a first threshold distance from a vehicle may be assigned a first default size, which may be defined as a number of pixels (e.g., 8×8, 8×16, 16×16, 24×24 pixels or the like) and may be trimmed to exclude a portion associated therewith that is associated with a non-roadway area, although, in some examples, if a patch includes an area that is excluded from patch generation the patch may still be generated if the majority of the area is roadway and/or sidewalk. In another example, the patch may be subdivided or resized so that the excluded portion is not included in more than a threshold number of the subdivided patches or until the resized patch does not include an excluded portion.

For example, patch 304 is an example of a patch that is located at or more than the first threshold distance from the vehicle 202. Patches outside this first threshold distance may be relatively larger than those patches that are within the first threshold distance from the vehicle. For example, patch 306 may be within the first threshold distance of the vehicle 202 and accordingly may have a second default size that is smaller than the first default size of those patches located outside the first threshold distance from the vehicle. In an additional or alternate example, patches may all be assigned the same default size and patches outside the first threshold distance may be resized to be larger upon determining that they are associated with a portion of the top-down representation 136 that is located outside the first threshold distance.

In an additional or alternate example, a patch may be resized larger from a default size for a portion of the environment that is occluded to one or more sensors of the vehicle 202, (see U.S. Pat. No. 11,048,265, filed Jun. 18, 2018, the entirety of which is incorporated by reference herein for all purposes) and/or if the portion of the top-down representation is associated with a location behind the vehicle by more than a second threshold distance. In additional or alternate examples, a portion of the environment occluded to one or more sensors of the vehicle 202 may be excluded from patch generation.

A patch may be resized smaller and/or subdivided if the portion of the top-down representation associated therewith is close to the vehicle, e.g., associated with a location within a third threshold distance of the vehicle 202. For example, patch 308 may be a patch that resulted from subdividing a larger patch that is within the third threshold distance of the vehicle 202.

Additionally or alternatively, a patch may be resized smaller and/or subdivided if the portion of the top-down representation associated therewith indicates (e.g., in one of the channels of the top-down representation) that an object exists within that portion (such as patch 310), a roadway feature (e.g., a curve of the road, junction, crosswalk, yield area, stop line), signage, a region of interest (e.g., construction, school zone, mass of detected objects such as pedestrians, animals, or detritus), and/or the like. Additionally or alternatively, the patch may be resized smaller and/or subdivided if the portion of the top-down representation associated with the patch is near a route, path, or trajectory of the vehicle 202.

In some examples, the patch size may be reduced to being a single pixel. A patch may additionally or alternatively indicate an embedding density associated therewith. For example, a single embedding may be determined for a whole patch, every/number of pixels in the embedding (where/is a positive integer), a percentage of pixels in the patch, or every pixel in the patch. In some examples, the patch generation method discussed herein may additionally or alternatively increase and decrease the number of pixels for which an embedding will be generated using the top-down representation, map data, and/or vehicle data. For example, the number of pixels for which an embedding may be generated within a patch may be increased for patches close to the vehicle 202 and/or a route/path/trajectory of the vehicle 202, for patches including an object, a roadway feature, signage, region of interest, and/or the like. Conversely, the number of pixels for which an embedding may be generated within a patch may decreased for a patch associated with a portion of the environment that is far from the vehicle, occluded to one or more sensors of the vehicle, and/or is behind the vehicle by a sufficient amount.

Although some patches are depicted as equal divisions of a larger patch, smaller patches may be determined in other manners, such as by determining a smaller patch within a larger patch, such as patch 310, in contrast with patch 308 which may be an example of a patch that results from equally subdividing a larger patch. Moreover, although the patches are depicted as not overlapping, in some examples, the patches may overlap. For example, a patch associated with an object or region of interest in the environment may be shifted to determine a new patch that overlaps the original patch. In some examples, embeddings may be generated for both the original patch and the new patch.

Figures 4A, 4B:
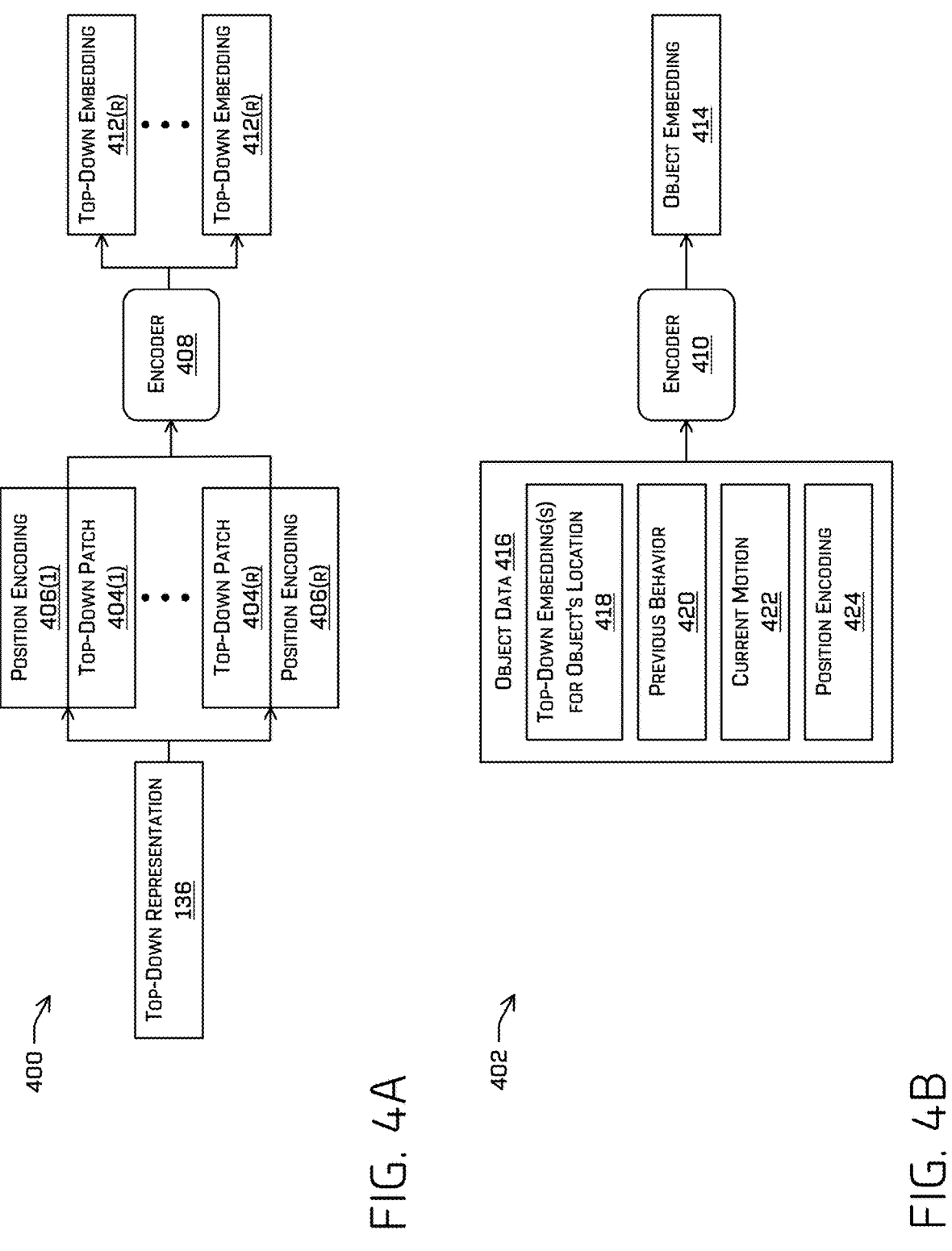
FIG. 4A illustrates a block diagram of part of an example transformer-based machine-learned model architecture with encoders that generate embeddings for top-down patches for use in cross-attention.
FIG. 4B illustrates a block diagram of part of an example transformer-based machine-learned model architecture with encoders that generate an object embedding for object data. In some examples, there may be multiple object embeddings for a single object.

Example Encoder Portion of the Transformer-Based Machine-Learned Model Architecture FIG. 4A illustrates a block diagram of an example architecture 400 that may be part of an example transformer-based machine-learned model architecture with encoders that generate embeddings for top-down patches for use in cross-attention. In some examples, example architecture 400 may operate as a preprocessing operation before object embedding(s) are generated for one or more objects for which predicted states are to be determined. FIG. 4B illustrates a block diagram of an example architecture 402 that may be part of an example transformer-based machine-learned model architecture with encoders that generate an object embedding for an object detection. In some examples, there may be multiple object embeddings for a single object. The cross-attention conducted by the transformer-based machine learning model may be determined between the top-down embeddings and an object embedding (or object embeddings where multiple object embeddings are associated with a single object). A second part of the transformer-based machine-learned model architecture is discussed in FIG. 5 that may, with example architectures 400 and 402, complete the transformer-based machine-learned model discussed herein by including decoder(s) and/or other ML model(s). The vehicle, object, and/or environment may be a real-world vehicle, object, and/or environment or a simulated vehicle, object, and/or environment. Either way, the sensor data may indicate real-world or simulated vehicle, object, and/or environment data. In a simulation example, the sensor data may be simulated. Simulation may be used to test operation of the vehicle and/or validate safe and/or efficacious operation of the vehicle. This may be particularly useful for testing new software and/or hardware before such software and/or hardware is implemented on a vehicle in the real-world.

The architecture 400 may determine embedding(s) for each patch of a top-down representation, as generated by the patch generation 300. The architecture 400 may determine one or more embeddings in association with a single patch, depending on whether a single embedding is generated per patch or multiple embeddings are generated per patch, according to the examples discussed above. A patch may be associated with a position encoding that identifies the position of the patch in the top-down representation/relative to the other patches and/or the position of the patch relative to the vehicle 202. For example, an r-th patch 404(r) of the r number of patches associated with a top-down representation may have a position encoding 406(r) associated therewith. In some examples, this positional encoding may be concatenated to the patch 404(r), but in other examples, the position encoding 406(r) may be concatenated to the embedding determined for the patch 404(r). In some examples, the positional embedding may be vehicle-relative, object-relative, or patch-relative. In other words, the position encoding for a patch may indicate a position of the patch relative to the vehicle 202, an object, or the other patch(es).

An encoder 408 may determine a top-down embedding 412 for up to each top-down patch 404. The encoder may project the portion of top-down representation indicated by a patch, such as top-down patch 404(r) into an embedding space as a top-down embedding 412(r). The embedding may be a high-dimensional vector or tensor that represents this data in the embedding space where distance in the embedding space represents different combinations of the environment features. In some examples, the encoder 408 may be configured as a self-attention transformer.

Similarly, encoder 410 may determine an object embedding 414 based at least in part on object data 416 for an object for which a predicted state is to be determined. The encoder may project object data 416 into an embedding space as the object embedding. The embedding may be a high-dimensional vector or tensor that represents this data in the embedding space where distance in the embedding space represents different combinations of the environment features. Object data 416 may comprise the top-down embedding(s) 418 associated with a patch that includes or is closest to the object (or multiple embeddings if multiple patches are associated with the object). Additionally or alternatively, the top-down embedding(s) 418 may include a single embedding determined by applying cross-attention over all the top-down embeddings and determining the embedding with a greatest attention score. Accordingly, the top-down embedding(s) 418 may have been determined by the architecture 500 for a previous iteration of operating architecture 500.

Additionally or alternatively, if multiple top-down embeddings are associated with an object (regardless of the number of patches associated with the same object), an object embedding may be generated for each top-down embedding that is associated with the object or a single top-down embedding may be generated from the multiple top-down embeddings, such as by concatenating the top-down embeddings together and/or determining an aggregated top-down embedding by linear layer(s) and/or a MLP. In an additional or alternate example, the top-down patch(es) that include the object detection may be used instead of the top-down embeddings. Regardless, the object data 416 may further include previous behavior 420 of the object, current motion of the object 422, and/or a position encoding 424. In an additional or alternate example, the object data 416 may include previous behavior 420 of the object, current motion of the object 422, and/or a position encoding 424 and may not include a top-down embedding or top-down patch, except for a portion of the top-down patch that may indicate object previous behavior, current motion, and/or position. The previous behavior 420 may indicate previous data associated with the object indicated by a track, such as one or more previous positions, orientations, velocities, accelerations, and/or other states associated with the object. The current motion of the object 422 may comprise a current position, orientation, velocity, acceleration, and/or other state. The position encoding 424 may encode a position of the object relative to the vehicle 202 and/or relative to other top-down patches. The position encoding 424 may additionally or alternatively be concatenated to the object embedding 414.

In some examples, encoder 408 and/or encoder 410 may comprise one or more linear projection layers. In some examples, although encoder 408 and encoder 410 are depicted as separate encoders, in some examples, the encoder 408 and encoder 410 may comprise different heads of a same encoder. The encoder 408 and/or encoder 410 may comprise a first unit comprising a multi-headed attention layer (which may receive the top-down patches for encoder 408, the object data for encoder 410, or both for an encoder that processes both top-down patches and object data), a first normalization layer that normalizes the output from the multi-headed attention layer and adds or concatenates the original inputs to the normalized output as a first intermediate output, a feedforward network (e.g., an MLP) that determines a second intermediate output based at least in part on the first intermediate output, and a second normalization layer that normalizes the second intermediate output and adds or concatenates the first intermediate output to the normalized feed forward network's output. This last output of the second normalization layer with the second intermediate output added thereto may include the top-down embeddings 412 (for encoder 408) and/or object embedding 414 (for encoder 410). In some examples, the first unit or any portion thereof may be repeated, such as by including an additional multi-headed attention layer and normalization/addition layer.

Example Decoder Portion of the Transformer-Based Machine-Learned Model

Figure 5:
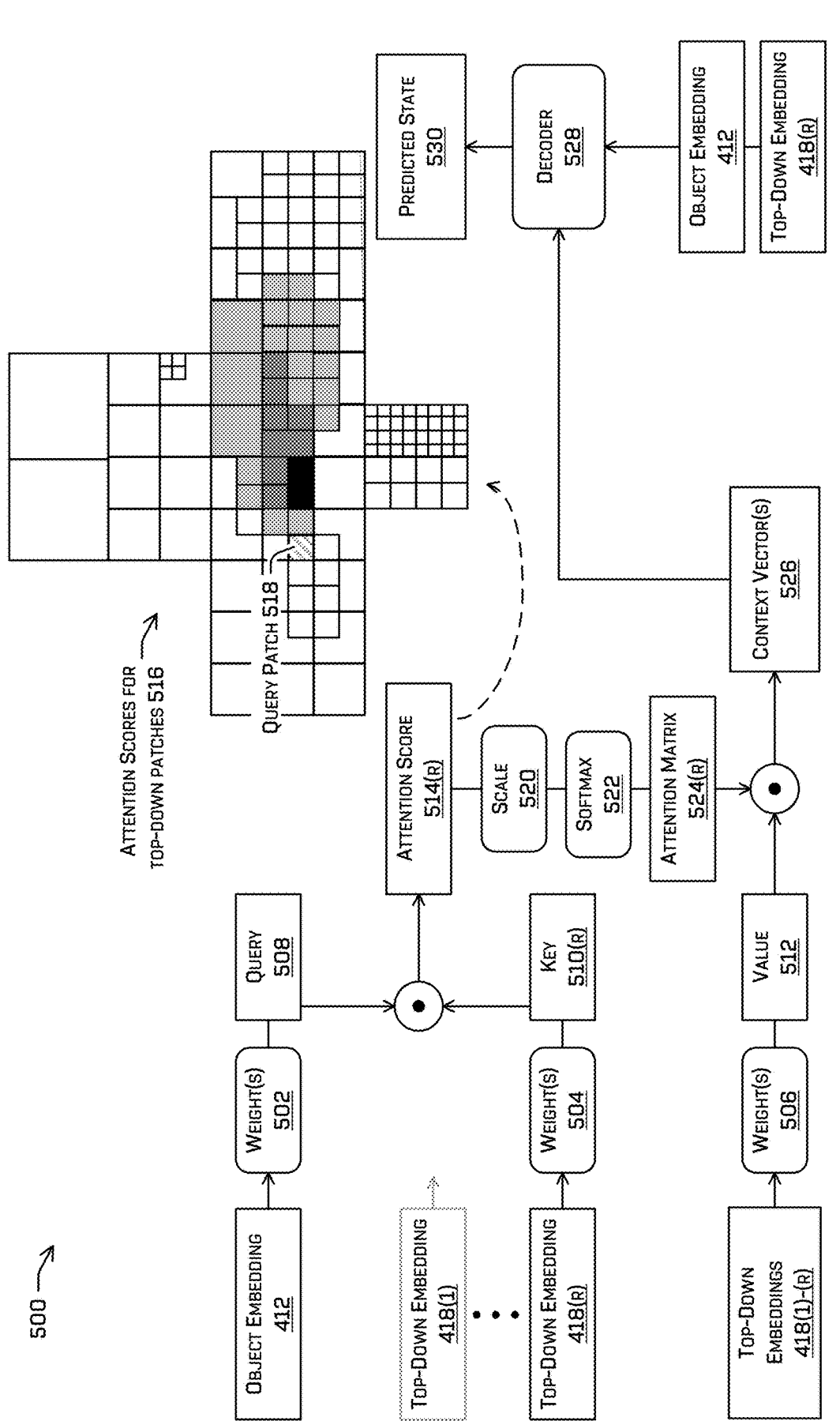
FIG. 5 illustrates a block diagram of additional parts of the example transformer-based machine-learned model for determining attention score(s) and using the attention score(s), ML model head(s), and/or decoder(s) to determine one or more predicted states associated with an object.

FIG. 5 illustrates a block diagram of an example architecture 500 of a decoder portion of the example transformer-based machine-learned model discussed herein. In some examples, the transformer-based machine-learned model may comprise example architecture 400, example architecture 402, and/or example architecture 500. This decoder portion may be used to determine attention score(s) and use the attention score(s), ML model head(s), and/or decoder(s) to determine predicted state(s) for an object that a vehicle can use to control operations of the vehicle. For example, the predicted state(s) may be at least part of prediction data used by the vehicle to control operations of the vehicle. Note that the discussion of FIG. 5 follows the processing of a single object embedding, object embedding 414 in a single-headed attention network, but a similar process may be followed for other object embeddings associated with the same object (in an example where multiple object embeddings are determined for the same object) or different objects and/or the example architecture may be a multi-headed attention network that may process the other object embeddings and top-down embeddings (grayed out in FIG. 5). However, attention scores may be generated between the object embedding 414 and up to all of the top-down embeddings within a threshold distance of the vehicle 202 or the object for which predicted state(s) are being generated.

The example architecture 500 may comprise weight matrices (i.e., weight(s) 502, weight(s) 504, and weight(s) 506) for determining a query, key, and value based at least in part on the object embedding 414 and top-down embedding 412($r$), and top-down embedding(s) 318(1)-($r$). The query, key, and value may each comprise different vectors or tensors generated from the respective embeddings as discussed below. Each of the weight matrices may be trained using the loss determined as discussed herein, to reduce the loss by altering one or more weights of any one or more of these weight matrices. For example, the weight(s) 502 may determine query 508 by multiplying the object embedding 414 by the weight(s) 502. The query 508 may comprise a vector or tensor. Similarly, the weight(s) 504 may determine key 510($r$) by multiplying the top-down embedding 412($r$) by the weight(s) 504 and the weight(s) 506 may determine values 512(1)-($r$) by multiplying the top-down embeddings 412(1)-($r$) by the weight(s) 506. The key 510 and values 512 may each be a vector or tensor. The values 512 may be values generated for one or more of the top-down embeddings 412(1)-($r$), up to all of the top-down embeddings 412(1)-($r$).

The example architecture 500 may determine an attention score 514($r$) (i.e., a cross-attention score) based at least in part on determining a dot product of query 508 with key 510($r$). In some examples, the attention score 514($r$) may be determined by determining a dot product of query 508 with a transpose of key 510($r$). The attention score may be any number before being scaled at 520 and/or softmaxed at 522. As a non-limiting example, attention scores 516 of object embedding 412 and top-down embeddings 412(1)-($r$) according to the depicted examples are illustrated in FIG. 5 as white and gray or black-filled patches. FIG. 5 also depicts a query patch 518, which may be a patch associated with the object and object embedding. White-filled patches may be patches associated with an attention score below a first threshold, light gray patches may be associated with an attention score between the first threshold and a second threshold, dark gray patches may be associated with an attention score between the second threshold and a third threshold, and the black patches may be associated with an attention score that meets or exceeds the third threshold. Note that this shading is merely given as an example and any other heatmap could be used to represent the attention scores 516, which may include attention scores 514(1)-($r$). Moreover, a heatmap need not be used and is given for the comprehension of the reader. Such a heat map and/or the attention scores 514(1)-($r$) may be used for debugging and/or model introspection. Ultimately, the black patches may indicate a most likely future position of the object (or a particular portion of the object associated with the query patch 518) at a particular future time, dark gray depicts second-most likely future positions of the object, light gray depicts third-most likely future positions of the object, and the white patches are highly unlikely to contain a future position of the object. Note that, although position is discussed for simplicity herein, the attention scores may be computed over multiple properties of the object data, such as position, orientation, velocity, acceleration, and/or other state. To give some explanation for the candidate meaning behind the depicted attention scores 516, relatively high attention scores, such as scores associated with the black or dark gray patches, mean that the key 510($r$) strongly correlates with the query 508 as containing predicted values, such as a predicted position, orientation, etc. of the object, according to the training discussed herein.

The attention score 514($r$) may then be scaled at 520 by dividing the attention score 514($r$) by the square root of the dimension of the key 510($r$). This result may be softmaxed at 522 to convert the result to a number between 0 and 1, as the attention matrix 524($r$). Determining a dot product of the attention matrix 524($r$) with values 512 may be used to determine a context vector(s) 526. The context vector(s) 526 may indicate the contextual information associated with object embedding 414 and may be provided to one or more decoder 528, which may determine a predicted state 530 associated with a future time and the object or object portion. In some examples, multiple context vectors 526 associated with different top-down patches (by virtue of determining a dot product between the attention matrices 524(1)-($r$) and the top-down embeddings (1)-($r$)) may be provided as input to the decoder 528 to determine the predicted state 530. Similarly to the attention scores 516 for the top-down patches depicted in FIG. 5, the predicted state 530 may be determined by determining a predicted state output for each top-down patch then determining the predicted state from among these outputs that is associated with a maximum attention score or a maximum combined attention score where multiple attention scores are determined for different properties of the object data.

Additionally or alternatively, in some examples, the decoder 528 may include a first multi-headed self-attention layer, a subsequent add and normalization layer, a second multi-headed self-attention layer, another add and normalization layer, a feedforward network (e.g., a MLP), and another add and normalization layer to determine the outputs discussed herein. In an additional or alternate example, the decoder 528 may include just a MLP. In some examples, the predicted state 530 may indicate a series of predicted states of an object forming a predicted track of the object. In some examples, the decoder 528 may additionally or alternatively receive a portion of map data surrounding the object, the object embedding 414, and/or top-down embedding 412($r$) as input as part of determining the predicted state 530. In some examples, the decoder 528 may use the context vector(s) 526 alone, the context vector 526 and object embedding 414 and/or top-down embedding 412($r$), or object embedding 414 and top-down embedding 412(*r*) to determine the predicted state 530.

The predicted state 530 may be provided, as part of the prediction data, to one or more downstream components of the vehicle. For example, the predicted state 530 may be provided to a planning component of the vehicle as part of prediction data for use by the planning component to determine a trajectory for controlling motion of the vehicle and/or other operations of the vehicle, such as whether to open or close an aperture, cause an emission (e.g., lights, turn signal, horn, speaker), transmit a request for teleoperations assistance, or the like.

Figure 6A:
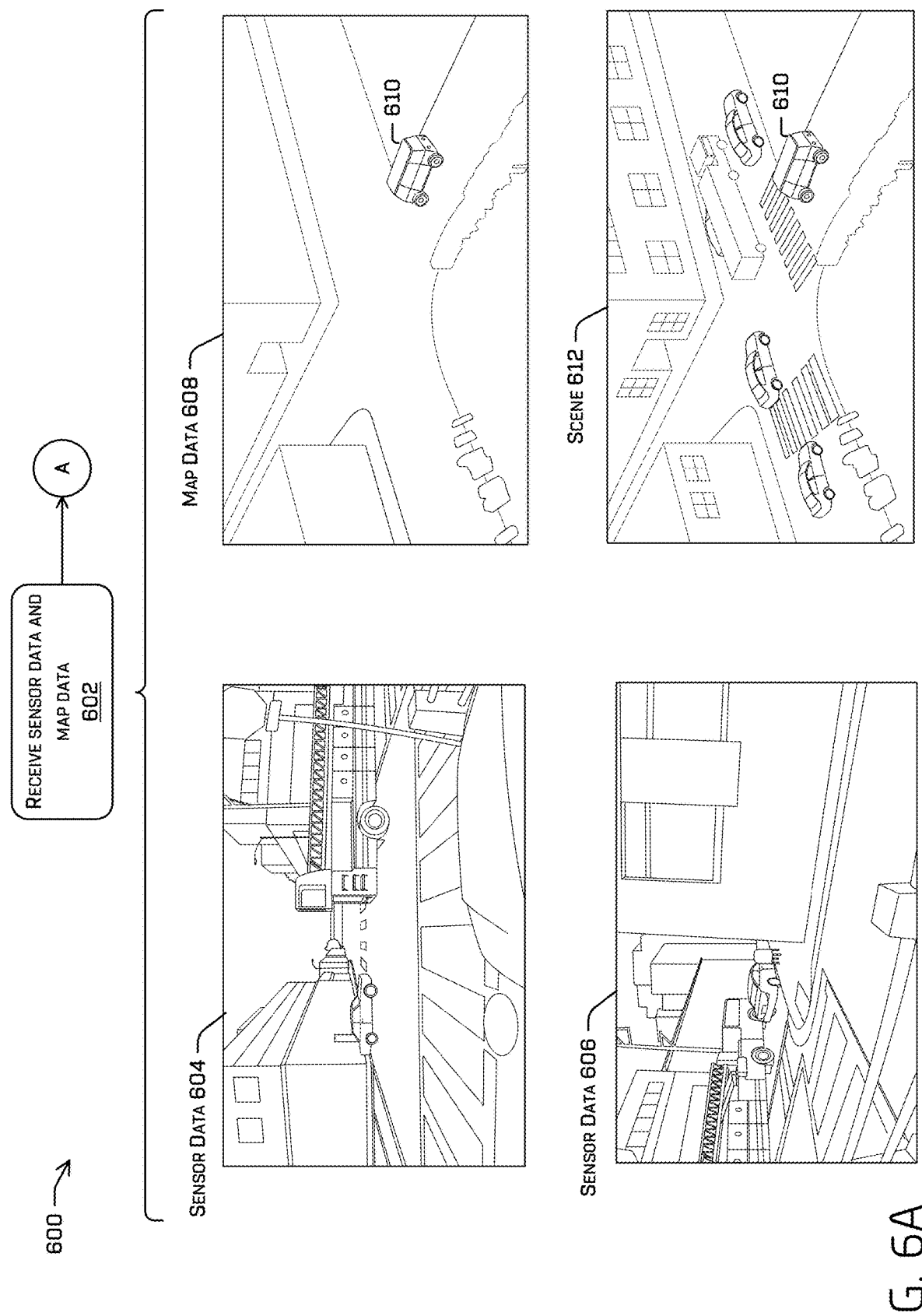
FIGS. 6A-6C depict a pictorial flow diagram of an example process for determining, by the transformer-based machine-learned model discussed herein, a predicted state of an object.
Figure 6B:
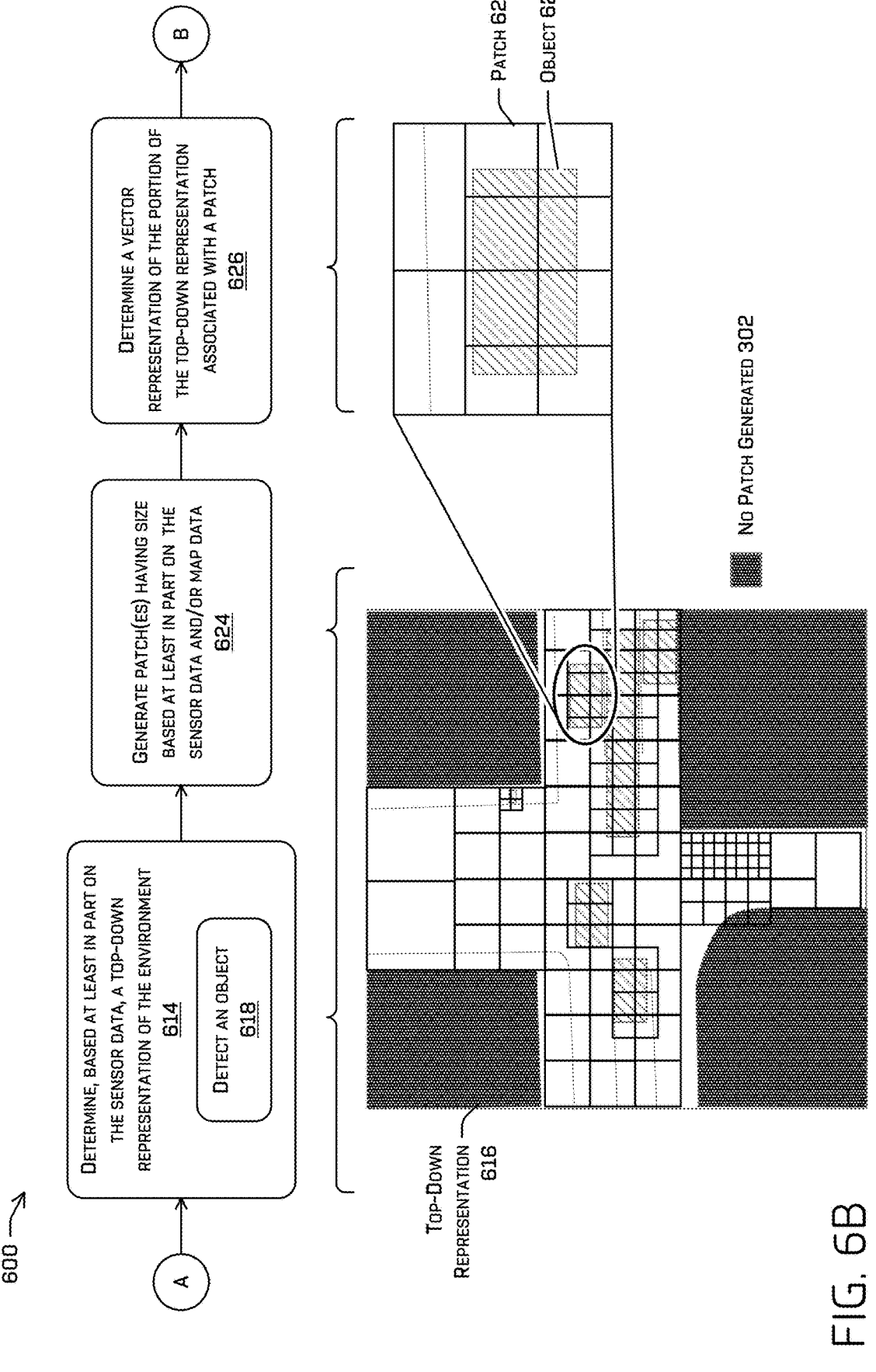
Figure 6C:
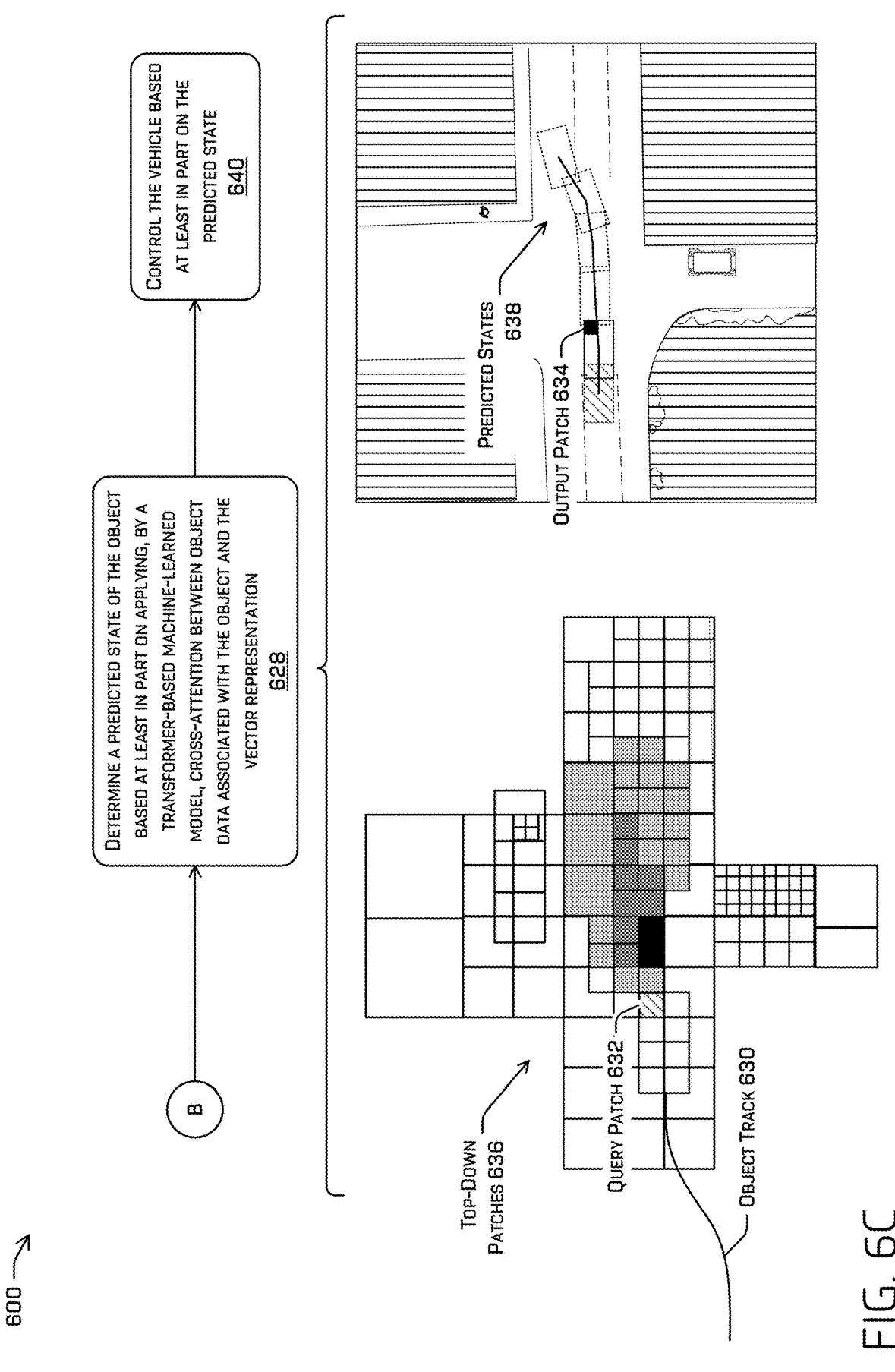

Example Process to Determine Perception Data Using the Transformer-Based Machine-Learned Model FIGS. 6A-6C depict a pictorial flow diagram of an example process 600 for determining, by the transformer-based machine-learned model discussed herein, a predicted state of an object. In some examples, example process 600 may be executed by the vehicle 202. Vehicle 202 may be configured, in hardware and/or software, with the architecture(s) 400, 402, and/or 500 and may execute example process 600 may processing receiving, determining, and/or retrieving the data discussed herein and processing it using architecture(s) 400, 402, and/or 500. In some examples, a prediction component of the vehicle 202 may execute process 600, such as by one or more CPU(s), GPU(s), TPU(s), and/or other processing units (e.g., ASIC(s), FPGA(s)). The operations of example process 600 may be used in combination, separately, and/or performed by the same device or different devices. For example, the operations can be implemented by a computing device of an autonomous vehicle 202 and/or a remote computing device (e.g., of a distributed computing service, of a teleoperations system). In the latter example, the autonomous vehicle 202 may transmit and receive data from a remote computing device while the processing of the operations is conducted at the remote computing device. Although the flow diagram depicts a sequence of blocks of operations, it is understood that the operations may be conducted in series, in parallel, or in a different order.

At operation 602, example process 600 may comprise receiving sensor data and map data, according to any of the techniques discussed herein. The sensor data may be any of the sensor data discussed herein, such as image data (e.g., visible light, infrared), lidar data, radar data, sonar data, microwave data, and/or the like, although the depictions of sensor data 604 and 606 in FIG. 6A includes image data for the sake of simplicity. For example, the vehicle 202 may receive sensor data 604 from a first sensor and sensor data 606 from a second sensor. In some examples, the transformer-based machine-learned model discussed herein may batch or parallel process sensor data received from different sensors, although, in a lidar example, the sensor data may be aggregated into a point cloud, which may be used as input to the transformer-based machine-learned model, or, in another example, a mesh or other representation and/or an object may be determined based at least in part on the point cloud.

In some examples, the map data 608 may comprise geometric data identifying shape(s) of surfaces in the environment and embedding(s) associated therewith. In some examples, the geometric data may be determined by SLAM based at least in part on sensor data and/or previously generated map data stored in a memory of the computer. For the sake of simplicity, the map data 608 depicted in FIG. 6A only depicts geometric data associated with the scene 612, although the map data 608 may further comprise a data structure with channels that indicate various types of data associated therewith, like labels, such as lane directionality, signage existence and type, regions of interest; junction type; roadway shape/extents; sidewalk shape/extents; off-road area indications; and/or the like. The portion of map data 608 retrieved may be based at least in part on a vehicle pose 610 within the environment identifying a position and orientation of the vehicle relative to the environment. The vehicle 202 may use SLAM and sensor data to determine a vehicle and/or sensor pose in the environment and the corresponding pose in the map data 608. The map data 608 may comprise static map data retrieved from a local or remote memory and may additionally or alternatively include map data that is determined using sensor data and/or SLAM. Both types of map data may include indications of static objects, but the dynamic map data (i.e., map data determined based at least in part on sensor data/SLAM) may include static object(s) that newly appear in or were removed from the scene 612, a state of a static object that has a changeable state (e.g., lane directionality, bridge states, lane open/closed state, signage/light state), and/or the like. Scene 612 is depicted for the sake of illustration and comprehension of the scene. Note that the map data 608 depicts static objects in the environment and may further indicate various features, as discussed above.

Turning to FIG. 6B, at operation 614, example process 600 may comprise determining based at least in part on the sensor data a top-down representation 616 of the environment, according to any of the techniques discussed herein. In some examples, operation 614 may comprise or be based at least in part on operation 618. Operation 618 may include detecting an object based at least in part on the sensor data. For example, FIG. 6B depicts detected objects as diagonally-hashed rectangles, including object 622. The top-down representation 616 may indicate detected object data and/or map data. A portion of the top-down representation 616, such as a pixel, may indicate object data and/or map data by one or more channels. For example, a pixel may have different channel(s) or subdivided channel(s) that indicate to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), and/or the like.

The top-down representation 616 may additionally or alternatively include channel(s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, crosswalk, parking location, passenger pickup/drop-off location), and/or the like. The channel(s) of the top-down representation 136 may additionally or alternatively indicate that a location associated with a pixel is outside a roadway and/or a sidewalk to facilitate exclusion of some areas of the top-down representation from the patch generation process discussed herein.

A channel may be entirely dedicated to one type of data such that all of the bits of the channel are devoted to indicating that type of data or may be subdivided such that different sections of the channel indicate different types of data. To give an example of the latter example, a first portion of a channel, such as the first two bits of an 8-bit channel may indicate a roadway type, the next bit may indicate whether the pixel is associated with a roadway, sidewalk, or neither, and the next five bits may indicate characteristics associated with a roadway. A channel may have any number of bits, depending on the storage constraints and/or object data and/or map data to be represented in the channels.

In some examples, multiple versions of the top-down representation environment may be determined in association with different times. For example, a first top-down representation may be associated with a current environment state, one or more second top-down representations may be associated with previous environment state(s), and/or one or more third top-down representations may be associated with predicted environment state(s). A predicted top-down representation 616 may determined based at least in part on the predicted state determined by example process 600.

At operation 624, example process 600 may comprise generating a patch having a size that is based at least in part on sensor data and/or map data, according to any of the techniques discussed herein. In some examples, operation 624 may additionally or alternatively be based at least in part on vehicle data, such as a vehicle position, direction of travel, velocity and/or acceleration, vehicle trajectory/path/route, and/or the like. Operation 624 may include a patch generation process that results in generating a set of patches over the top-down representation 616, where an individual patch is associated with a portion of the top-down representation 616. The discussion herein uses the word top-down patch to indicate the area of the top-down representation 616 associated with the patch and/or the data of the top-down representation indicated by the patch. A patch may also be called a window. The patch generation process may include determining to exclude a portion of the top-down representation 616 from patch generation. For example, operation 624 may comprise excluding portions of the top-down representation 616 that are associated with non-roadway areas or both non-roadway and non-sidewalk areas (as indicated in the depicted example top-down representation 616 as shaded areas 302).

In some examples, the patch may be determined based at least in part on the top-down representation 616. In some examples, the patch may have a size and/or dimensions that may be determined based at least in part on sensor data, map data, and/or vehicle data. In some examples, the relevant sensor data and/or map data for this determination may be indicated in the top-down representation 616, although, in some additional or alternate examples, additional or alternate data may be used beside the top-down representation 616. In an additional or alternate example, the patch may indicate a resolution. The resolution may indicate a number of embeddings that are to be generated for that patch using the portion of the top-down representation indicated by the patch. In an additional or alternate example, each patch may have a resolution of 1 and patches may be downsized to a single pixel in size.

Operation 624 may include dynamically sizing the patches based at least in part on object data (which is determined based at least in part on sensor data and/or perception data) and/or map data. In some examples, operation 624 may additionally or alternatively dynamically size a patch based at least in part on vehicle data, which may indicate data related to the vehicle 202, such as a position, orientation, velocity, acceleration, state, current trajectory, next trajectory, path, and/or route associated with the vehicle, for example. Dynamically sizing a patch may include determining a size and/or dimensions for a patch based at least in part on any of this data. In some examples, patch generation for a portion of the top-down representation 616 may start with a default sized patch and may either scale the patch size up or down, either by resizing the patch or subdividing the patch. Resizing the patch may comprise altering a dimension of at least one side of the patch.

For example, patches outside a first threshold distance from a vehicle may be assigned a first default size, which may be defined as a number of pixels (e.g., 8×8, 8×16, 16×16, 24×24 pixels or the like) and may be trimmed to exclude a portion associated therewith that is associated with a non-roadway area, although, in some examples, if a patch includes an area that is excluded from patch generation the patch may still be generated if the majority of the area is roadway and/or sidewalk. In another example, the patch may be subdivided or resized so that the excluded portion is not included in more than a threshold number of the subdivided patches or until the resized patch does not include an excluded portion. In an additional or alternate example, patches may all be assigned the same default size and patches outside the first threshold distance may be resized to be larger upon determining that they are associated with a portion of the top-down representation 616 that is located outside the first threshold distance.

In an additional or alternate example, a patch may be resized larger from a default size for a portion of the environment that is occluded to one or more sensors of the vehicle 202, (see U.S. Pat. No. 11,048,265, filed Jun. 18, 2018, the entirety of which is incorporated by reference herein for all purposes) and/or if the portion of the top-down representation is associated with a location behind the vehicle by more than a second threshold distance. In some examples, the second threshold distance may be determined based at least in part on a velocity of the vehicle 202, such that the second threshold distance is shorter as the velocity decreases and larger as the velocity increases. In additional or alternate examples, a portion of the environment occluded to one or more sensors of the vehicle 202 may be excluded from patch generation.

A patch may be resized smaller and/or subdivided if the portion of the top-down representation associated therewith is close to the vehicle, e.g., associated with a location within a third threshold distance of the vehicle 202. Additionally or alternatively, a patch may be resized smaller and/or subdivided if the portion of the top-down representation associated therewith indicates (e.g., in one of the channels of the top-down representation) that an object exists within that portion (such as patch 620), a roadway feature (e.g., a curve of the road, junction, crosswalk, yield area, stop line), signage, a region of interest (e.g., construction, school zone, mass of detected objects such as pedestrians, animals, or detritus), and/or the like. Additionally or alternatively, the patch may be resized smaller and/or subdivided if the portion of the top-down representation associated with the patch is near a route, path, or trajectory of the vehicle 202.

In some examples, the patch size may be reduced to being a single pixel. A patch may additionally or alternatively indicate a resolution. The resolution may indicate an embedding density associated therewith. For example, a single embedding may be determined for a whole patch, every/number of pixels in the embedding (where/is a positive integer), a percentage of pixels in the patch, or every pixel in the patch. In some examples, the patch generation method discussed herein may additionally or alternatively increase and decrease the number of pixels for which an embedding will be generated using the top-down representation, map data, and/or vehicle data. For example, the number of pixels for which an embedding may be generated within a patch may be increased for patches close to the vehicle 202 and/or a route/path/trajectory of the vehicle 202, for patches including an object, a roadway feature, signage, region of interest, and/or the like. Conversely, the number of pixels for which an embedding may be generated within a patch may decreased for a patch associated with a portion of the environment that is far from the vehicle, occluded to one or more sensors of the vehicle, and/or is behind the vehicle by a sufficient amount.

In some examples, a first set of factors may be used to determine a size and/or dimensions of a patch and a second set of factors may be used to determine a resolution of the embeddings generated for the patch. The first set of factors and second set of factors may include any of the factors for sizing a patch discussed above.

At operation 626, example process 600 may comprise determining, by the transformer-based machine learning model, a vector representation of the portion of the top-down representation 616 associated with a patch. The vector representation may be an embedding, which may be a vector or tensor in a high-dimensional embedding space. Determining the vector representation may comprise projecting the portion of the top-down representation 616 indicated by a patch, i.e., top-down patch, into an embedding space as determined by the encoder's trained parameters. In some examples, an encoder of the transformer-based machine learning model, such as architecture 400, may accomplish operation 626. In some examples, the encoder may determine a single embedding per patch. In an additional or alternate example, the encoder may determine a number of embeddings per patch as specified by a resolution indicated by the patch. In this latter example, the encoder may divide the patch into a number of portions equal to the resolution and may determine an embedding for each of these portions. In an additional or alternate example, these multiple embeddings may be aggregated into a single embedding to represent the patch, such as by concatenating them together or projecting them into a second embedding space using linear layers and/or a MLP. Either way, whether a single or multiple embeddings are determined for a patch, such embedding(s) are referred to herein as a top-down embedding for a respective top-down patch. Collectively, all the embeddings generated for the top-down patches may be considered a feature map, wherein a portion of the feature may include a patch and its embedding(s). In some examples, after training the encoder, embeddings generated by the encoder may be quantized to reduce a size of the embedding.

Turning to FIG. 6C, at operation 628, example process 600 may comprise determining a predicted state of a detected object based at least in part on applying, by a transformer-based machine learning model, cross-attention between object data associated with the object and the vector representation. Operation 628 may comprise determining, by a encoder, an object embedding based at least in part on the object data. For example, operation 628 may be executed by architecture(s) 402 and/or 500. In some examples, the object embedding may be determined by architecture 402 based at least in part on previous behavior of the object indicated by an object track 630, which may comprise a previous position, orientation, velocity, acceleration, other state, and/or path of the object. The object embedding may additionally or alternatively be determined by the encoder based at least in part on current motion of the object, which may be detected by the perception component and may comprise a current position, orientation, velocity, acceleration, and/or other state of the object. The object embedding may additionally or alternatively be determined by the encoder based at least in part on a position encoding associated with the object that indicates a location of the object relative to map data feature(s), the vehicle 202, and/or one or more top-down patches. The object embedding may additionally or alternatively be determined by the encoder based at least in part on top-down patch(es) that include the object detection. The encoder may determine the object embedding by projecting any of this data into an embedding space as determined by the encoder's trained parameters. The embedding space may be a same embedding space as the embedding space into which the top-down representation data is projected or, in another example, the embedding spaces may be different.

In some examples, the object embedding may be used as a query or used as a basis for the query, such as in examples where the object embedding may be multiplied by a set of trained weight(s) to determine the query. For comprehension's sake and where the object embedding was generated using a top-down embedding, the query may be associated with a top-down patch, indicated as the query patch 632 in FIG. 6C. The query patch 632 is indicated in hashes. In some examples, one of the keys with which cross-attention may be determined may be include a top-down embedding associated with a top-down patch that includes the object, including a top-down patch that is collocated with the query patch 632.

Cross-attention may be applied between the query and each key determined for top-down embeddings generated for top-down patches within a threshold distance of the object or the vehicle 202. Functionally, this means cross-attention may be applied between the query and each of the keys within the threshold distance. A key may be determined for a top-down embedding by multiplying the top-down embedding with second trained weight(s) or the top-down embedding may be used as the key itself. Cross-attention between the query and a key may include determining a dot product between the query and the key (or a transpose of the key) resulting in an attention score that may be used itself to determine the predicted state or, in another example, the attention score and a value may be used to determine a context vector that may be used by a decoder to determine the predicted state. FIG. 6C depicts attention scores for the top-down patches 636 based on the query patch 632 as gray-scale values. In such an example, the attention score may be scaled and softmaxed to determine an attention intermediate output. A dot product between the attention intermediate output and the value may result in the context vector. The value may be determined by multiplying the top-down embeddings generated for top-down patches within the threshold distance by a third set of trained weight(s) or the value may include the top-down embeddings themselves. The context vector may be processed by the decoder to determine the predicted state.

The predicted state may indicate a predicted position, orientation, velocity, acceleration, and/or other state of the object associated with a future time. To indicate the predicted position, the decoder may indicate a top-down patch that the object (or portion of the object with which the query patch 632 is associated) is predicted to occupy at the future time. In the illustrated example this may include output patch 634. Output patch 634 may be generated for a query patch 632 that is associated with part of an object. Accordingly, output patch 634 may be one of multiple patches output by the decoder that, collectively, may indicate the area predicted to be occupied by the object. Additionally or alternatively, the decoder may output a predicted state of the object separate from or in addition to indicate a patch the object is likely to occupy. For example, the decoder may determine a predicted state or series of states of the object without regard for the patches and may indicate a predicted position, orientation, velocity, acceleration, classification (e.g., prediction of whether the object will park/unpark, cross roadway/junction, turn, activate a blinker, change an aperture state, yield/not yield to the vehicle 202), and/or area occupied by the vehicle at a future time or over a sequence of times regardless of the patches.

In an additional or alternate example, the output of the decoder may comprise a confidence score (e.g., a likelihood, which may be a posterior probability) that the object or object portion will occupy a top-down patch and/or confidence score(s) for predicted attributes associated with the object, such as the orientation, velocity, acceleration, and/or other state which may or may not be associated with a particular top-down patch. The shading of the top-down patches 636 may illustrate values of these confidence scores. For example, confidence scores output by the decoder below a first confidence score threshold are filled with white, confidence scores between the first confidence score threshold and a second confidence score threshold (confidence scores indicating it's somewhat likely the object will occupy these patches) are filled with light gray, confidence scores between the second confidence score threshold and a third confidence score threshold are filled with dark gray (confidence scores indicating it's likely the object will occupy these patches), and confidence scores above the third confidence score threshold are filled with black (confidence scores indicating it's highly likely the object will occupy these patches).

Additionally or alternatively, the decoder may use an attention score and/or context vector(s) to project the attention score and/or context vector(s) into an output space. For example, the output space may comprise logits associated with predicted state data, such as a logit indicating a likelihood that the object will occupy a particular position or patch in the environment; a logit associated with a quantized range of headings of the object or a raw value indicating the heading; a logit or raw value associated with object velocity and/or acceleration; a logit indicating a likelihood that the object will have a particular other state (e.g., open door, turning indicator on, parked); and/or the like. This may be one way of determining a predicted state of the object without referencing particular patches. For example, the logits output by the decoder may indicate likelihood(s) for various attributes of a predicted state or series of states of the object without regard for the patches and may indicate a predicted position, orientation, velocity, acceleration, classification (e.g., prediction of whether the object will park/unpark, cross roadway/junction, turn, activate a blinker, change an aperture state, yield/not yield to the vehicle 202), and/or area occupied by the vehicle at a future time or over a sequence of times.

Note that a first predicted state for a first future time may be used as the basis to determine a second predicted state for a second future time. To determine the second predicted state, the values and keys may be the same but the query may be determined from a new object embedding determined based at least in part on the first predicted state. For example, the new object embedding may be based at least in part on updated object data that indicates previous behavior data that further includes any previous predicted object data, the current object motion data may be based at least in part on the first predicted state, the position encoding may be based at least in part on a position indicated in the first predicted state, and/or the top-down patch(es) used to create the new object embedding may be top-down patch(es) that include a predicted location/area occupied by the object according to the first predicted state. In other words, operation 628 may be repeated using the first predicted state as the current state of the object to predict the second predicted state of the object. This may be repeated until a time horizon is reached, resulting in predicted states 638, which may include a series of predicted states over future times up until the horizon time.

At operation 640, example process 600 may comprise controlling an autonomous vehicle based at least in part on the predicted state(s) of the object, according to any of the techniques discussed herein. For example, the planning component 114 may determine a route for the vehicle 202 from a first location to a second location; generate, substantially simultaneously and based at least in part on any of the outputs, a plurality of candidate trajectories for controlling motion of the vehicle 102 in accordance with a receding horizon technique (e.g., a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters)) to control the vehicle to traverse the route (e.g., in order to avoid any of the detected objects); and select one of the candidate trajectories as a trajectory of the vehicle 102 that may be used to generate a drive control signal that may be transmitted to drive components of the vehicle 102. Determining which of the candidates to implement may be based at least in part on a cost function that is based at least in part on the predicted state(s). In another example, the planning component 114 may determine other controls based at least in part on the predicted state(s), such as whether to open or close a door of the vehicle, activate an emitter of the vehicle, or the like.

Example Clauses

A: A system comprising: one or more processors; and non-transitory memory storing processor-executable instructions that, when executed by the one or more processors, cause the system to perform operations comprising: receiving sensor data associated with an environment surrounding a vehicle; determining, based at least in part on the sensor data, a top-down representation of the environment; determining, as a patch generation operation, a patch having a patch size determined based at least in part on maintaining, increasing, or decreasing a default patch size based at least in part on at least one of map data or the sensor data, wherein the patch indicates a portion of the top-down representation; determining a vector representation of the portion of the top-down representation and the patch; detecting, based at least in part on the sensor data, an object in the environment and a location of the object; determining a predicted state of the object associated with a future time based at least in part on applying, by a transformer-based machine-learned model, cross-attention between object data associated with the object and the vector representation; and controlling the vehicle based at least in part on the predicted state.

B: The system of paragraph A, wherein the operations further comprise determining, based at least in part on at least one of the map data or the sensor data, a second portion of the top-down representation for which the patch generation operation either increases a second size of a second patch associated with the second portion or excludes the second portion of the top-down representation of the environment from the patch generation operation.

C: The system of paragraph B, wherein: determining to increase the second size of the second patch is based at least in part on at least one of: determining that the second portion is behind the vehicle; determining that the second portion is at a distance from the vehicle that meets or exceeds a threshold distance; or determining that the second portion is occluded to one or more sensors of the vehicle; and determining to exclude the second portion from the patch generation operation is based at least in part on at least one of: determining that the map data indicates that the second portion is outside a roadway; or determining that the second portion is at a distance from the vehicle that meets or exceeds a threshold distance.

D: The system of any one of paragraphs A-C, wherein the operations further comprise receiving a track indicating previous behavior of the object and applying cross-attention comprises: determining a query vector based at least in part on at least one of the object data associated with the object or the previous behavior; determining a score based at least in part on determining cross-attention between the query vector and a key vector that is based at least in part on the vector representation; and determining the predicted state based at least in part on the score.

E: The system of any one of paragraphs A-D, wherein the patch generation operation decreases the patch size based at least in part on determining that the patch is associated with an area of the environment that at least one of: includes the object; includes a roadway feature; includes signage; includes a region of interest; is within a first threshold distance of the vehicle; or is within a second threshold distance of a heading or path of the vehicle.

F: The system of any one of paragraphs A-E, wherein the patch size is further based at least in part on a velocity of the vehicle.

G: One or more non-transitory computer-readable media storing processor-executable instructions that, when executed by one or more processors, perform operations comprising: receiving a top-down representation of an environment; receiving object data indicating an object in the environment; determining, as a patch generation operation, a patch indicating a portion of the top-down representation, wherein the patch has a patch size that is determined based at least in part on at least one of map data or the object data; determining a vector representation of the portion of the top-down representation; determining a predicted state of an object in the environment based at least in part on applying, by a transformer-based machine-learned model, cross-attention between object data associated with the object and the patch; and controlling a vehicle based at least in part on the predicted state.

H: The one or more non-transitory computer-readable media of paragraph G, wherein the object data is based at least in part on sensor data and the operations further comprise determining, based at least in part on at least one of the map data or the object data, a second portion of the top-down representation for which the patch generation operation either increases a second size of a second patch associated with the second portion or excludes the second portion of the top-down representation of the environment from the patch generation operation.

I: The one or more non-transitory computer-readable media of paragraph H, wherein: determining to increase the second size of the second patch is based at least in part on at least one of: determining that the second portion is behind the vehicle; determining that the second portion is at a distance from the vehicle that meets or exceeds a threshold distance; or determining that the second portion is occluded to one or more sensors of the vehicle; and determining to exclude the second portion from the patch generation operation is based at least in part on at least one of: determining that the map data indicates that the second portion is outside a roadway; or determining that the second portion is at a distance from the vehicle that meets or exceeds a threshold distance.

J: The one or more non-transitory computer-readable media of any one of paragraphs G-I, wherein the operations further comprise receiving a track indicating previous behavior of the object and applying cross-attention comprises: determining a query vector based at least in part on at least one of the object data associated with the object or the previous behavior; determining a score based at least in part on determining cross-attention between the query vector and a key vector that is based at least in part on the vector representation; and determining the predicted state based at least in part on the score.

K: The one or more non-transitory computer-readable media of paragraph J, wherein: determining the query vector comprises: determining, from among multiple patches associated with the top-down representation, that the patch is associated with a location of the object; determining, by a first machine-learned model based at least in part on the previous behavior, a first embedding and multiplying the first embedding by a first set of learned weights; determining the key vector comprises determining, by a second machine-learned model based at least in part on the vector representation and a position of the patch, a second embedding and multiplying the second embedding by a second set of learned weights; and determining the predicted state is based at least in part on: determining a context vector based at least in part on a dot product between a value vector and a set of scores including the score, wherein the value vector is determined based at least in part on the vector representation; and determining, by a transformer decoder using the context vector, the predicted state.

L: The one or more non-transitory computer-readable media of either paragraph J or K, wherein: a location of the object is at least part of a first predicted state determined based at least in part on a previous iteration of cross-attention that is based at least in part on a current location of the object; the predicted state is a second predicted state associated with a second time, the second time being later than a first time associated with the first predicted state; and the previous behavior comprises a hidden behavior state associated with the first time determined by the transformer-based machine-learned model as part of the previous iteration of cross-attention.

M: The one or more non-transitory computer-readable media of any one of paragraphs G-L, wherein the patch generation operation decreases the patch size based at least in part on determining that the patch is associated with an area of the environment that at least one of: includes the object; includes a roadway feature; includes signage; includes a region of interest; is within a first threshold distance of the vehicle; or is within a second threshold distance of a heading or path of the vehicle.

N: The one or more non-transitory computer-readable media of any one of paragraphs G-M, wherein the patch size is further based at least in part on a velocity of the vehicle.

O: The one or more non-transitory computer-readable media of any one of paragraphs G-N, wherein determining the vector representation comprises determining, by a machine-learned model, an embedding based at least in part on at least one of data associated with the portion of the top-down representation or a position of the patch relative to at least one of a current position of the vehicle or a position of the patch relative to another patch.

P: The one or more non-transitory computer-readable media of any one of paragraphs G-O, wherein the predicted state of the object comprises at least one of a future position, orientation, classification, velocity, or acceleration of the object.

Q: A method comprising: receiving a top-down representation of an environment; receiving object data indicating an object in the environment; determining, as a patch generation operation, a patch indicating a portion of the top-down representation, wherein the patch has a patch size that is determined based at least in part on at least one of map data or the object data; determining a vector representation of the portion of the top-down representation; determining a predicted state of an object in the environment based at least in part on applying, by a transformer-based machine-learned model, cross-attention between object data associated with the object and the patch; and controlling a vehicle based at least in part on the predicted state.

R: The method of paragraph Q, further comprising determining, based at least in part on at least one of the map data or the object data, a second portion of the top-down representation for which the patch generation operation either increases a second size of a second patch associated with the second portion or excludes the second portion of the top-down representation of the environment from the patch generation operation.

S: The method of either paragraph Q or R, further comprising receiving a track indicating previous behavior of the object and applying cross-attention comprises: determining a query vector based at least in part on at least one of the object data associated with the object or the previous behavior; determining a score based at least in part on determining cross-attention between the query vector and a key vector that is based at least in part on the vector representation; and determining the predicted state based at least in part on the score.

T: The method of any one of paragraphs Q-S, wherein the patch generation operation decreases the patch size based at least in part on determining that the patch is associated with an area of the environment that at least one of: includes the object; includes a roadway feature; includes signage; includes a region of interest; is within a first threshold distance of the vehicle; or is within a second threshold distance of a heading or path of the vehicle.

U: The system of any one of paragraphs A-F, wherein the predicted state of the object comprises at least one of a future position, orientation, classification, velocity, or acceleration of the object.

V: The system of paragraph A, wherein determining the vector representation comprises determining, by a machine-learned model, an embedding based at least in part on at least one of data associated with the portion of the top-down representation or a position of the patch relative to at least one of a current position of the vehicle or a position of the patch relative to another patch.

W: The system of paragraph A, wherein: determining the query vector comprises: determining, from among multiple patches associated with the top-down representation, that the patch is associated with the location; determining, by a first machine-learned model based at least in part on the previous behavior, a first embedding and multiplying the first embedding by a first set of learned weights; determining the key vector comprises determining, by a second machine-learned model based at least in part on the vector representation and a position of the patch, a second embedding and multiplying the second embedding by a second set of learned weights; and determining the predicted state is based at least in part on: determining a context vector based at least in part on a dot product between a value vector and a set of scores including the score, wherein the value vector is determined based at least in part on the vector representation; and determining, by a transformer decoder using the context vector, the predicted state.

X: The system of paragraph D, wherein: the location is at least part of a first predicted state determined based at least in part on a previous iteration of cross-attention that is based at least in part on a current location of the object; the predicted state is a second predicted state associated with a second time, the second time being later than a first time associated with the first predicted state; and the previous behavior comprises a hidden behavior state associated with the first time determined by the transformer-based machine-learned model as part of the previous iteration of cross-attention.

While the example clauses described above are described with respect to one particular implementation, it should be understood that, in the context of this document, the content of the example clauses can also be implemented via a method, device, system, computer-readable medium, and/or another implementation. Additionally, any of examples A-X may be implemented alone or in combination with any other one or more of the examples A-X.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as candidately representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
non-transitory memory storing processor-executable instructions that, when executed by the one or more processors, cause the system to perform operations comprising:
receiving sensor data associated with an environment surrounding a vehicle;
determining, based at least in part on the sensor data and map data, a top-down representation of the environment;
determining, as a patch generation operation, a plurality of patches, an individual patch of the plurality of patches having a patch size determined based at least in part on maintaining, increasing, or decreasing a default patch size based at least in part on at least one of the map data or the sensor data, wherein;
the individual patch indicates a portion of the top-down representation,
increasing the default patch size is associated with lowering a resolution for cross-attention associated with data included in the portion of the top-down representation, and
decreasing the default patch size is associated with heightening the resolution for cross-attention associated with data included in the portion of the top-down representation;

determining a vector representation of the portion of the top-down representation and the individual patch;
detecting, based at least in part on the sensor data, an object in the environment and a location of the object;
determining a predicted state of the object associated with a future time based at least in part on applying, by a transformer-based machine-learned model, cross-attention between object data associated with the object and the vector representation, the object data having the resolution for cross-attention; and
controlling the vehicle based at least in part on the predicted state.

2. The system of claim 1, wherein the operations further comprise determining, based at least in part on at least one of the map data or the sensor data, a second portion of the top-down representation for which the patch generation operation either increases a second size of a second patch associated with the second portion or excludes the second portion of the top-down representation of the environment from the patch generation operation.

3. The system of claim 2, wherein:
determining to increase the second size of the second patch is based at least in part on at least one of:
determining that the second portion is behind the vehicle;
determining that the second portion is at a distance from the vehicle that meets or exceeds a threshold distance; or
determining that the second portion is occluded to one or more sensors of the vehicle; and
determining to exclude the second portion from the patch generation operation is based at least in part on at least one of:
determining that the map data indicates that the second portion is outside a roadway; or
determining that the second portion is at a distance from the vehicle that meets or exceeds a threshold distance.

4. The system of claim 1, wherein the operations further comprise receiving a track indicating previous behavior of the object and applying cross-attention comprises:
determining a query vector based at least in part on at least one of the object data associated with the object or the previous behavior;
determining a score based at least in part on determining cross-attention between the query vector and a key vector that is based at least in part on the vector representation; and
determining the predicted state based at least in part on the score.

5. The system of claim 1, wherein the patch generation operation decreases the patch size based at least in part on determining that the individual patch is associated with an area of the environment that at least one of:
includes the object;
includes a roadway feature;
includes signage;
includes a region of interest;
is within a first threshold distance of the vehicle; or
is within a second threshold distance of a heading or path of the vehicle.

6. The system of claim 1, wherein the patch size is further based at least in part on a velocity of the vehicle.

7. One or more non-transitory computer-readable media storing processor-executable instructions that, when executed by one or more processors, perform operations comprising:

receiving a top-down representation of an environment;

receiving object data indicating an object in the environment;

determining, as a patch generation operation based at least in part on the top-down representation, a plurality of patches, an individual patch of the plurality of patches comprising a spatial subdivision of the top-down representation, wherein the individual patch has a patch size that is determined based at least in part on at least one of map data or the object data;

determining a vector representation of the spatial subdivision of the top-down representation;

determining a predicted state of the object in the environment based at least in part on applying, by a transformer-based machine-learned model, cross-attention between object data associated with the object and the individual patch; and controlling a vehicle based at least in part on the predicted state.

8. The one or more non-transitory computer-readable media of claim 7, wherein the object data is based at least in part on sensor data and the operations further comprise determining, based at least in part on at least one of the map data or the object data, a second portion of the top-down representation for which the patch generation operation either increases a second size of a second patch associated with the second portion or excludes the second portion of the top-down representation of the environment from the patch generation operation.

9. The one or more non-transitory computer-readable media of claim 8, wherein:

determining to increase the second size of the second patch is based at least in part on at least one of:

determining that the second portion is behind the vehicle;

determining that the second portion is at a distance from the vehicle that meets or exceeds a threshold distance; or determining that the second portion is occluded to one or more sensors of the vehicle; and determining to exclude the second portion from the patch generation operation is based at least in part on at least one of:

determining that the map data indicates that the second portion is outside a roadway; or determining that the second portion is at a distance from the vehicle that meets or exceeds a threshold distance.

10. The one or more non-transitory computer-readable media of claim 7, wherein the operations further comprise receiving a track indicating previous behavior of the object and applying cross-attention comprises:

determining a query vector based at least in part on at least one of the object data associated with the object or the previous behavior;

determining a score based at least in part on determining cross-attention between the query vector and a key vector that is based at least in part on the vector representation; and determining the predicted state based at least in part on the score.

11. The one or more non-transitory computer-readable media of claim 10, wherein:

determining the query vector comprises:

determining, from among multiple patches associated with the top-down representation, that the individual patch is associated with a location of the object;

determining, by a first machine-learned model based at least in part on the previous behavior, a first embedding and multiplying the first embedding by a first set of learned weights;

determining the key vector comprises determining, by a second machine-learned model based at least in part on the vector representation and a position of the individual patch, a second embedding and multiplying the second embedding by a second set of learned weights; and determining the predicted state is based at least in part on:

determining a context vector based at least in part on a dot product between a value vector and a set of scores including the score, wherein the value vector is determined based at least in part on the vector representation; and determining, by a transformer decoder using the context vector, the predicted state.

12. The one or more non-transitory computer-readable media of claim 10, wherein:

a location of the object is at least part of a first predicted state determined based at least in part on a previous iteration of cross-attention that is based at least in part on a current location of the object;

the predicted state is a second predicted state associated with a second time, the second time being later than a first time associated with the first predicted state; and the previous behavior comprises a hidden behavior state associated with the first time determined by the transformer-based machine-learned model as part of the previous iteration of cross-attention.

13. The one or more non-transitory computer-readable media of claim 7, wherein the patch generation operation decreases the patch size based at least in part on determining that the individual patch is associated with an area of the environment that at least one of:

includes the object;

includes a roadway feature;

includes signage;

includes a region of interest;

is within a first threshold distance of the vehicle; or is within a second threshold distance of a heading or path of the vehicle.

14. The one or more non-transitory computer-readable media of claim 7, wherein the patch size is further based at least in part on a velocity of the vehicle.

15. The one or more non-transitory computer-readable media of claim 7, wherein determining the vector representation comprises determining, by a machine-learned model, an embedding based at least in part on at least one of data associated with the spatial subdivision of the top-down representation or a position of the individual patch relative to at least one of a current position of the vehicle or a position of the individual patch relative to another patch.

16. The one or more non-transitory computer-readable media of claim 7, wherein the predicted state of the object comprises at least one of a future position, orientation, classification, velocity, or acceleration of the object.

17. A method comprising:

receiving a top-down representation of an environment;

receiving object data indicating an object in the environment;

determining, as a patch generation operation, a plurality of patches, an individual patch of the plurality of patches indicating a portion of the top-down representation, wherein the individual patch has a patch size that is determined based at least in part on at least one of map data or the object data and the individual patch comprises an embedding density for the individual patch;

determining, based at least in part on the embedding density, a vector representation of the portion of the top-down representation;

determining a predicted state of the object in the environment based at least in part on applying, by a transformer-based machine-learned model, cross-attention between the object data associated with the object and the individual patch; and controlling a vehicle based at least in part on the predicted state.

18. The method of claim 17, further comprising determining, based at least in part on at least one of the map data or the object data, a second portion of the top-down representation for which the patch generation operation either increases a second size of a second patch associated with the second portion or excludes the second portion of the top-down representation of the environment from the patch generation operation.

19. The method of claim 17, further comprising receiving a track indicating previous behavior of the object and applying cross-attention comprises:

determining a query vector based at least in part on at least one of the object data associated with the object or the previous behavior;

determining a score based at least in part on determining cross-attention between the query vector and a key vector that is based at least in part on the vector representation; and determining the predicted state based at least in part on the score.

20. The method of claim 17, wherein the patch generation operation decreases the patch size based at least in part on determining that the individual patch is associated with an area of the environment that at least one of:

includes the object;

includes a roadway feature;

includes signage;

includes a region of interest;

is within a first threshold distance of the vehicle; or is within a second threshold distance of a heading or path of the vehicle.

\* \* \* \* \*